(12) United States Patent
Suciu

(10) Patent No.: US 8,997,951 B2
(45) Date of Patent: Apr. 7, 2015

(54) ACTIVELY CONTROLLED COLLOIDAL DAMPER

(75) Inventor: Claudiu Valentin Suciu, Fukuoka (JP)

(73) Assignee: School Juridical Person of Fukuoka Kogyo Daigaku, Fukuoka (JP)

( * ) Notice: Subject to any disclaimer, the term of this patent is extended or adjusted under 35 U.S.C. 154(b) by 1351 days.

(21) Appl. No.: 12/452,039

(22) PCT Filed: May 29, 2008

(86) PCT No.: PCT/JP2008/001356
§ 371 (c)(1),
(2), (4) Date: Mar. 5, 2010

(87) PCT Pub. No.: WO2008/152776
PCT Pub. Date: Dec. 18, 2008

(65) Prior Publication Data
US 2010/0193305 A1 Aug. 5, 2010

(30) Foreign Application Priority Data

Jun. 14, 2007 (JP) ................. 2007-157758

(51) Int. Cl.
F16F 9/30 (2006.01)
F16F 9/00 (2006.01)
F16F 9/46 (2006.01)

(52) U.S. Cl.
CPC ............... *F16F 9/006* (2013.01); *F16F 9/003* (2013.01); *F16F 9/465* (2013.01); *F16F 2224/04* (2013.01)

(58) Field of Classification Search
CPC ........... F16F 9/006; F16F 9/003; F16F 9/465; F16F 2224/04
USPC ................ 188/266.1, 267.1, 267.2, 268; 252/62.52–62.56
See application file for complete search history.

(56) References Cited

U.S. PATENT DOCUMENTS

| | | | | |
|---|---|---|---|---|
| 3,360,086 A | * | 12/1967 | Damske | 188/313 |
| 3,424,448 A | * | 1/1969 | Chak Ma | 267/35 |
| 6,052,992 A | | 4/2000 | Eroshenko | 60/509 |
| 6,527,972 B1 | * | 3/2003 | Fuchs et al. | 252/62.54 |
| 6,615,959 B2 | | 9/2003 | Eroshenko | 188/268 |
| 6,886,819 B2 | * | 5/2005 | Kintz et al. | 267/140.14 |
| 2003/0010587 A1 | | 1/2003 | Eroshenko | 188/314 |
| 2004/0173422 A1 | * | 9/2004 | Deshmukh et al. | 188/267.2 |

FOREIGN PATENT DOCUMENTS

| | | |
|---|---|---|
| JP | 2002-539577 A | 11/2002 |
| JP | 2003-521646 A | 7/2003 |
| JP | 2004-044732 A | 2/2004 |
| JP | 2005-121092 A | 5/2005 |
| JP | 2006-118571 A | 5/2006 |
| WO | 96/18040 A1 | 6/1996 |
| WO | 00/54280 A1 | 9/2000 |
| WO | 01/55616 A1 | 8/2001 |

* cited by examiner

*Primary Examiner* — Robert A Siconolfi
*Assistant Examiner* — Mahbubur Rashid
(74) *Attorney, Agent, or Firm* — Kubovcik & Kubovcik

(57) ABSTRACT

An actively controlled colloidal damper having controllable damping characteristics. The damper has a cylinder (2); a piston (4) reciprocatably guided and supported by the cylinder (2) and forming a closed space (3) in cooperation with the cylinder (2); a porous body (8) having a large number of fine holes and received in the closed space (3); operation liquid (7) received in the closed space (3) together with the porous body (8), flowing into the fine holes in the porous body (8) when the pressure in the closed space (3) is increased, and flowing out of the fine holes when the pressure in the closed space (3) is decreased, and pressure regulation means, such as a servo value (6) and a pump device (10), for regulating the pressure in the closed space (3).

16 Claims, 20 Drawing Sheets

PRIOR ART

No initial pressure

Low initial pressure

Medium initial pressure

Medium initial pressure

Medium initial pressure

High initial pressure

ACTIVELY CONTROLLED COLLOIDAL DAMPER

FIELD OF THE INVENTION

This invention relates to a colloidal damper which accommodates in a closed space a mixture (colloidal solution) of a porous body such as silica gel and a working liquid, and allows the working liquid to flow-into the pores of the porous body and to flow-out from the pores of the porous body in order to dissipate the mechanical energy externally applied to the colloidal damper, and more particularly this invention relates to an active-control colloidal damper which is able to change its damping performances.

BACKGROUND ART

The generally employed automobile suspension is comprised of a coil spring and a hydraulic damper. In the case of a suspension with such a structure, when the suspension receives an impact (shock), the coil spring is compressed, and thereby absorbs the mechanical energy. Thereafter, when the coil spring is extended, the absorbed energy is transferred to the hydraulic damper, and the hydraulic damper dissipates the energy of shock and vibration by converting the mechanical energy into thermal energy by virtue of the fluid friction.

As an example of previously developed damper, a colloidal damper which accommodates in a closed space a mixture of a porous body, such as silica gel, and a working liquid, and allows the working liquid to flow-into the pores of the porous body and to flow-out from the pores of the porous body in order to dissipate the mechanical energy externally applied to the colloidal damper has been developed (see for instance, the Patent References 1 and 2). Furthermore, the inventor of the present invention has made improvements of the colloidal damper, as shown in the Patent References 3 to 5, in order to be able to maintain the requisite performances, even the colloidal damper is repeatedly used over a sufficient number of cycles, according to a specific practical application.

Patent Reference 1: International Publication 96/18040 pamphlet
Patent Reference 2: International Publication 01/55616 pamphlet
Patent Reference 3: Japanese Patent Application Publication No. 2004-44732
Patent Reference 4: Japanese Patent Application Publication No. 2005-121092
Patent Reference 5: Japanese Patent Application Publication No. 2006-118571

DISCLOSURE OF THE INVENTION

Problems to be Solved by the Invention

A conventional colloidal damper is a so-called passive-control damper, and accordingly, it is designed to have constant damping characteristics (such as the dissipated energy and the damping coefficient). However, in order to efficiently dissipate the energy of vibration and/or impact (shock) caused by an external excitation (for instance, the displacement excitation caused by the road roughness in the case of an automobile suspension, the excitation force of an earthquake in the case of an anti-earthquake (anti-seismic) system, etc.), it is necessary to adjust (control) the damping characteristics of a damper.

In view of the above-mentioned problems, the objective of the present invention is to provide an active-control colloidal damper capable of controlling its damping characteristics.

Solution to the Problems

The active-control colloidal damper in accordance with the present invention includes a cylinder, a piston guided and supported by the cylinder during its reciprocating movement, and defining a closed space in association with the cylinder, a porous body having a large number of pores, and being housed in the closed space, and a working liquid contained in the closed space together with the porous body, the working liquid flowing into the pores of the porous body during pressurization, and flowing out from the pores of the porous body during depressurization, and a pressure controlling device to adjust the pressure in the closed space.

In the case of an active-control colloidal damper in accordance with the present invention, since the pressure in the closed space formed by both the cylinder and the piston is adjusted by using the pressure controlling device the damping characteristics can be thereby actively controlled. FIG. 1A is a drawing to explain the operation principle of the active-control colloidal damper in accordance with the present invention, and FIG. 1B is a drawing to explain the operation principle of a conventional passive-control colloidal damper.

In FIG. 1A, the equilibrium equation of the pressures relative to the closed space can be written as follows.

$$P = p + p_f \qquad (1)$$

In the Equation (1), "P" ($P=4F/(\pi D^2)$) represents the external pressure, "p" represents the internal pressure (caused by colloidal solution), "$p_f$" ($p_f=4F_f/(\pi D^2)$) represents the friction pressure (caused by friction), "F" represents the external force, "$F_f$" represents the friction force, and "D" represents the piston diameter. The friction pressure (friction force) operates in opposite direction to the piston velocity. Thus, the direction of the friction force during pressurization is opposite to direction in which the friction force operates during depressurization.

Total dissipated energy $E_t$ of the colloidal damper is calculated in accordance with the Equation (2).

$$E_t = 0.25\pi D^2 \oint P(S)dS = 0.25\pi D^2 \oint p(S)dS + \oint F_f(S)dS = E + E_f \qquad (2)$$

In the Equation (2), $$E = 0.25\pi D^2 \oint p(S)dS$$

represents the energy dissipated by colloidal solution, and $$E_f = \oint F_f(S)dS$$

represents the energy dissipated by friction. "S" represents the displacement excitation (stroke). The friction force $F_f$ is depending on the contact conditions between the piston and the packing, between the piston and the cylinder, as well as between the piston and the packing cover.

Total damping coefficient $C_t$ of the colloidal damper is calculated in accordance with the Equation (3).

$$C_t = \frac{E_t}{\pi \omega S_V^2} = \frac{E}{\pi \omega S_V^2} + \frac{E_f}{\pi \omega S_V^2} = C + C_f \qquad (3)$$

In the Equation (3), $$C = E/(\pi \omega S_V^2)$$

represents the damping coefficient produced by the colloidal solution, and $$C_f = E_f/(\pi \omega S_V^2)$$

represents the damping coefficient produced by friction. "$S_V$" represents the amplitude of the displacement excitation S.

Disregarding the influences caused by friction, the maximum dissipated energy $E_{max}$ and the maximum damping coefficient $C_{max}$, both produced by the colloidal solution, can be calculated in accordance with the Equation (4).

$$E_{max} = E_0 = \frac{\pi D^2}{4} \int_0^{S_{max}} [p_c(S) - p_r(S)] dS; \qquad (4)$$

$$C_{max} = C_0 = \frac{E_0}{\pi \omega S_V^2}$$

In the Equation (4), "$p_c$" represents the internal pressure during pressurization, and "$p_r$" represents the internal pressure during depressurization.

FIG. 2A shows the damping characteristic provided when an initial pressure $p_0$ in the closed space is adjusted by means of the active-control colloidal damper in accordance with the present invention, and FIG. 2B shows the damping characteristic of a conventional passive-control colloidal damper.

The damping characteristic of a conventional passive-control colloidal damper (the initial pressure $p_0=0$, the start position $S_0=0$, as shown in FIG. 2B) can be calculated in accordance with the Equation (5).

$$E_{p_0=0} = \frac{\pi D^2}{4} \int_{-S_V}^{S_V} [p_c(S) - p_r(S)] dS = \qquad (5)$$

$$\frac{\pi D^2}{4} \int_0^{S_V} [p_c(S) - p_r(S)] dS < E_0;$$

$$C_{p_0=0} = \frac{E_{p_0=0}}{\pi \omega S_V^2} < C_0$$

On one hand, the damping characteristic of the active-control colloidal damper in accordance with the present invention (the initial pressure $p_0>0$, the start position $S_0>0$, as shown in FIG. 2A) can be calculated in accordance with the Equation (6).

$$E_{p_0>0} = \frac{\pi D^2}{4} \int_{S_0-S_V}^{S_0+S_V} [p_c(S) - p_r(S)] dS = \qquad (6)$$

$$\frac{\pi D^2}{4} \int_0^{S_0+S_V} [p_c(S) - p_r(S)] dS > E_{p_0=0};$$

$$C_{p_0>0} = \frac{E_{p_0>0}}{\pi \omega S_V^2} > C_{p_0=0}$$

Herein, the initial pressure $p_0$ (the start position $S_0$) is a controllable parameter.

Since the amplitude $S_V$ of the displacement excitation is depending on the amplitude of the road roughness and on the mechanism of the automobile suspension, the amplitude $S_V$ is generally an uncontrollable parameter. Furthermore, since the circular frequency ω

$$\omega = 2\pi \frac{V}{\lambda} \qquad (7)$$

is depending on both the travel velocity V of the automobile, and on the wavelength λ of the road roughness, the circular frequency ω is generally an uncontrollable parameter.

Consequently, it can be said that in the case of passive-control colloidal damper (see FIG. 2B and the Equation (5)), if the amplitude of the displacement excitation is smaller than the maximum stroke $S_{max}$ ($S_V < S_{max}$), although the colloidal damper has sufficient damping capability, the energy of vibration and impact (shock) is not efficiently dissipated. Oppositely, since the initial pressure $p_0$ (the start position $S_0$) is a controllable parameter in the case of active-control colloidal damper (see FIG. 2A and the Equation (6)), it becomes possible to control the damping characteristic in order to achieve the optimization of the damping characteristic, by adjusting the initial pressure $p_0$ to attain the movement of the sinusoidal wave of the displacement excitation $S_V \sin(\omega t)$, over the distance $S_0$.

In other words, if the pressure controlling device is designed to adjust the initial pressure in the closed space of the active-control colloidal damper in accordance with the present invention, it would be possible to control the damping characteristic by adjusting the initial pressure in the closed space by means of the pressure controlling device. Furthermore, the pressure controlling device may be designed, for instance, to be consisted of a pumping device in communication with the working liquid accommodated inside of the closed space, and being able to produce the flow-into the closed space and the flow-out from the closed space of the working liquid.

As an alternative, the pressure controlling device may be consisted of an oscillator (shaker, vibration generator) used to apply elastic waves to the porous body, to the working liquid, or to the cylinder. Herein, the elastic waves can be acoustic waves and/or ultrasonic waves, etc., and for instance, a device which generates such acoustic waves and/or ultrasonic waves, etc. may be employed as oscillator instead of the above-mentioned pumping device. By exciting bending waves at the walls of the pores of the porous bodies, by using such a device which generates acoustic waves and/or ultrasonic waves, etc., an acoustic radiation pressure $p_{rad}$ acts on the working liquid, and further, by adjusting the initial pressure $p_0$ by means of the acoustic radiation pressure $p_{rad}$ defined in the Equation (8), it is possible to control the damping characteristic of the active-control colloidal damper in accordance with the present invention.

$$p_0 = p_{rad} = \pi^2 \rho f_V^2 u_0^2 (2+\Gamma) \qquad (8)$$

In the Equation (8), "ρ" represents the density of the working liquid, "$f_v$" represents the frequency of acoustic waves and/or ultrasonic waves, "$u_0$" represents the amplitude of the bending waves at the walls of the pores of the porous bodies, and "Γ" is a non-dimensional parameter which depends on the shape of the pores of the porous bodies.

Additionally, the active-control colloidal damper in accordance with the present invention may be designed to include, as the pressure controlling device, a surface tension controlling device to control the surface tension of at least one of the porous body and the working liquid.

The active-control colloidal damper in accordance with the present invention uses a colloidal solution consisted of porous bodies and a working liquid. The large number of pores of each of the porous bodies forms an inner structure like a labyrinth, and thus, during pressurization, the working liquid is forced to flow-into the pores (see FIG. 3A), in which case, the Equation (Laplace-Washburn Equation) expressing the balance between the internal pressure inside the cylinder and the capillary pressure (Laplace pressure), can be written as follows.

$$p = -\frac{2\gamma_L \cos\theta}{r} \quad (9)$$

In the Equation (9), "$\gamma_L$" represents the surface tension of the working liquid (for instance, water, antifreeze liquid, etc.), and "$\theta$" represents the contact angle. For instance, in the case of a porous body consisted of hydrophobized porous silica gel, that is, silica gel having a coated surface with hydrophobic molecules (see FIG. 3A), the contact angle $\theta$ becomes larger than 90 degrees, and thus, the working liquid does not wet the surface of the solid (see FIG. 3B). In the case of hydrophobized porous silica gel, the outer surfaces of the silica gel micro-particles and also the internal surfaces of the pores (wall surfaces) are treated to become hydrophobic, for instance, by employing as molecules of the hydrophobic coating (see FIG. 3A) linear molecular chains of organo-silicon compounds.

From the Young's Equation one expresses the contact angle as follows $$\cos\theta = \frac{\gamma_S - \gamma_{SL}}{\gamma_L} \quad (10)$$

and after the insertion of Equation (10) into the Equation (9), based on the Neumann's Equation (11)

$$\gamma_{SL} - \gamma_S = \gamma_L - 2\sqrt{\gamma_L \gamma_S} \exp[-\beta(\gamma_L \gamma_S)^2] \quad (11)$$

that expresses the relationship between the surface tension $\gamma_s$ of the porous body (solid), the surface tension $\gamma_L$ of the working liquid, and the surface tension $\gamma_{SL}$ of the solid-liquid interface one obtains a relationship between the internal pressure inside the cylinder and the surface tensions in accordance with Equation (12).

$$p = \frac{2}{r}\{\gamma_L - 2\sqrt{\gamma_L \gamma_S} \exp[-\beta(\gamma_L - \gamma_S)^2]\} \quad (12)$$

Since $\beta=1.241\times10^{-4}[(mN/m)^{-2}]$ is a constant, it can be considered as an uncontrollable parameter. Thus, based on the Equation (12), one concludes that it is possible in the case of the active-control colloidal damper in accordance with the present invention to control its damping characteristic by controlling the surface tensions of the porous body (solid) and/or the working liquid by employing a surface tension controlling device.

Herein, the relationship between the fluctuation rate of the internal pressure inside the cylinder and the fluctuation rate of the surface tension can be expressed in accordance with the Equation (13).

$$\frac{\Delta p}{p} = \frac{\Delta \gamma_L}{\gamma_L} f_1(\gamma_L, \gamma_S); \quad \frac{\Delta p}{p} = -\frac{\Delta \gamma_S}{\gamma_S} f_2(\gamma_L, \gamma_S) \quad (13)$$

In the Equation (13), the negative sign (−) means that if the surface tension of the porous body (solid) decreases, the internal pressure inside the cylinder increases. The functions $f_{1,2}(\gamma_L, \gamma_S)$ depending on the surface tensions are defined in accordance with the Equations (14) and (15).

$$f_1(\gamma_L, \gamma_S) = \frac{1 - \left[\sqrt{\frac{\gamma_S}{\gamma_L}} - 4\beta\sqrt{\gamma_L \gamma_S}(\gamma_L - \gamma_S)\right]}{1 - 2\sqrt{\frac{\gamma_S}{\gamma_L}} \exp[-\beta(\gamma_L - \gamma_S)^2]} \exp[-\beta(\gamma_L - \gamma_S)^2] \quad (14)$$

$$f_2(\gamma_L, \gamma_S) = \frac{\left[\sqrt{\frac{\gamma_L}{\gamma_S}} + 4\beta\sqrt{\gamma_L \gamma_S}(\gamma_L - \gamma_S)\right]}{\frac{\gamma_L}{\gamma_S} - 2\sqrt{\frac{\gamma_L}{\gamma_S}} \exp[-\beta(\gamma_L - \gamma_S)^2]} \exp[-\beta(\gamma_L - \gamma_S)^2] \quad (15)$$

The surface tension controlling device may be comprised of an electric-field controlling device to control the electric field in the closed space. By controlling the electric field in the closed space, the shape of a droplet of polar liquid (for instance, working liquids such as water, alcohol, glycerin, etc.) existing in the closed space varies, and thus, the apparent surface tension of the working liquid increases (see FIG. 4). Accordingly, it is possible in the case of the active-control colloidal damper in accordance with the present invention to control the damping characteristic by controlling the electric field in the closed space by employing an electric-field controlling device.

As an alternative, the surface tension controlling device may be comprised of a magnetic-field controlling device to control the magnetic field in the closed space, in which case, the working liquid existing in the closed space is necessary to be a liquid with magnetic properties. For instance, when water is selected as working liquid, iron particles, as one example of magnetic material, can be added in water, in this way the water being transformed into a liquid with magnetic properties. By controlling the magnetic field in the closed space, the shape of a droplet of liquid with magnetic properties existing in the closed space varies, and thus, the apparent surface tension of the working liquid increases (see FIG. 5). In such a case, the fluctuation rate of the surface tension of the working liquid, induced by the magnetic field, can be expressed in accordance with the Equation (16).

$$\Delta\gamma_L/\gamma_L = 0.0025(\mu M_S V_m H/kT)^{4/5} \quad (16)$$

In the Equation (16), "H" represents the magnetic field, "$\mu$" represents the magnetic permeability, "$M_s$" represents the saturation magnetization of the magnetic particles mixed into the working liquid, "$V_m$" represents the volume of magnetic particles mixed into the working liquid, "k" represents the Boltzmann's constant, and "T" represents the temperature. Accordingly, it is possible in the case of the active-control colloidal damper in accordance with the present invention to control the damping characteristic by controlling the magnetic field in the closed space by employing a magnetic-field controlling device.

As another alternative, the surface tension controlling device may be comprised of a temperature controlling device to control the temperature of the porous body and/or the working liquid both being accommodated in the closed space. For instance, since the surface tension of the working liquid is depending on temperature in accordance with the linear function given by Equation (17), it is possible in the case of the active-control colloidal damper in accordance with the present invention to control its damping characteristic by controlling the temperature of the working liquid existing in the closed space.

$$\gamma_L = 76 - 0.17T [\text{mN/m}] \qquad (17)$$

In the case of the active-control colloidal damper in accordance with the present invention, the working liquid may include a surfactant having a reversible oxidation-reduction characteristic (reversibly oxidized or reduced), and in such a case, the surface tension controlling device may be comprised of an electrochemical controlling device to control the reversible oxidation-reduction characteristic of the surfactant. It becomes possible to control the surface tension of the porous body and/or the working liquid by reversibly oxidizing or reducing them by employing an electrochemical controlling device working on a surfactant that has a reversible oxidation-reduction characteristic (for instance, molecules including ferrocenyl groups, $Fe(CH_2)_{11}N(CH_3)_3Br$, etc.), and accordingly, it becomes possible to control the damping characteristic of the active-control colloidal damper in accordance with the present invention.

As an alternative, the working liquid may be designed to include a surfactant exhibiting a reversible photoisomerization characteristic when irradiated by light or an ultraviolet ray, and the surface tension controlling device may be comprised of an irradiating device to irradiate the surfactant by light or an ultraviolet ray to control the reversible photoisomerization characteristic. It becomes possible to control the surface tension of the porous body and/or the working liquid by employing an irradiating device to irradiate with light or an ultraviolet ray in order to carry-out a reversible photoisomerization on a surfactant (for instance, molecules including azobenzene groups, molecules including p-phenyl azoacrylanilide group, BTHA (water-soluble azobenzene-based photosensitive bolaform surfactant), (trimethylammoniumhexyloxy) azobenzene dibromide, sodium dodecyl sulfate, etc.) that exhibits a reversible photoisomerization characteristic when irradiated by light or an ultraviolet ray, and accordingly, it becomes possible to control the damping characteristic of the active-control colloidal damper in accordance with the present invention.

As another alternative, the pressure controlling device may be comprised of a diameter controlling device to control the inner diameter of the pores of the porous body. One understands based on the Equation (12) that it becomes possible to control the damping characteristic of the active-control colloidal damper in accordance with the present invention by controlling the inner diameter of the pores, and thereby to control the pressure in the closed space.

The relationship between the fluctuation rate of the internal pressure "p" inside the cylinder and the fluctuation rate of the radius "r" of the pore can be given in accordance with the Equation (18).

$$\frac{\Delta p}{p} = -\frac{\Delta r}{r} \qquad (18)$$

In the Equation (18), the negative sign (−) means that if the radius "r" of the pore decreases, the internal pressure "p" inside the cylinder increases. Radius of the pore can be controlled by means of an internal-diameter controlling device which is able to rotate, extend or contract the molecules used for the hydrophobic coating of the porous body. FIG. 6 illustrates the way in which the radius of a pore varies when the molecules are rotated, extended or contracted. As illustrated in FIG. 6, it becomes possible to vary the thickness of the hydrophobic coating (film) by rotating, extending or contracting the molecules, and thus, it becomes possible to control the radius of a pore. As a result, it becomes possible to control the damping characteristic of the active-control colloidal damper in accordance with the present invention.

Concerning the device able to rotate, extend or contract the molecules of the hydrophobic coating, it may be comprised of an irradiating device to irradiate the hydrophobic film by light or ultraviolet rays. Since the molecules of the hydrophobic coating are rotated, extended or contracted during irradiation with light or ultraviolet rays, it would be possible to control the rate of rotation, extension or contraction of the molecules of the hydrophobic coating by adjusting the irradiation level of the light or ultraviolet rays, and thereby to control the radius of the pore, and accordingly, it becomes possible to control the damping characteristic of the active-control colloidal damper in accordance with the present invention.

The active-control colloidal damper in accordance with the present invention may be designed to include a pressure controlling device comprised of a mass controlling device to control the mass of at least one of the porous body and the working liquid.

Inserting the Equation (12) into the Equation (4), the maximum dissipated energy of the colloidal damper can be written in accordance with the Equation (19).

$$E_{max} = \frac{\pi D^2}{2} \int_0^{S_{max}} \frac{\gamma_{L,c}(S) - 2\sqrt{\gamma_{L,c}(S)\gamma_{S,c}(S)} \exp\{-\beta[\gamma_{L,r}(S) - \gamma_{S,r}(S)]^6\}}{r_c(S)} dS - \frac{\pi D^2}{2} \int_0^{S_{max}} \frac{\gamma_{L,r}(S) - 2\sqrt{\gamma_{L,r}(S)\gamma_{S,r}(S)} \exp\{-\beta[\gamma_{L,r}(S) - \gamma_{S,r}(S)]^6\}}{r_r(S)} \qquad (19)$$

In the Equation (19), "$\gamma_{L,c}$" represents the surface tension of the working liquid during pressurization, "$\gamma_{S,c}$" represents the surface tension of the solid during pressurization, "$\gamma_{L,r}$" represents the surface tension of the working liquid during depressurization, "$\gamma_{S,r}$" represents the surface tension of the solid during depressurization, "$r_c$" represents the radius of the pore during pressurization, and "$r_r$" represents the radius of the pore during depressurization. By using the specific volume [$m^3$/kg] of the pore instead of the piston stroke S [m], a change of coordinates can be carried-out in accordance with the Equation (20), $$dS = \frac{4M}{\pi D^2} dV_P; \ S = 0 \rightarrow V_P = 0; \ S = S_{max} \rightarrow V_P = V_{P,max} \qquad (20)$$

and then, the maximum dissipated energy of the colloidal damper can be written in accordance with the Equation (21).

$$E_{max} = 2M \left\{ \int_0^{V_{P,max}} \frac{\gamma_{L,c}(V_P) - 2\sqrt{\gamma_{L,c}(V_P)\gamma_{S,c}(V_P)} \exp\{-\beta[\gamma_{L,c}(V_P) - \gamma_{S,c}(V_P)]^2\}}{r_c(V_P)} dV_P - \right. \qquad (21)$$

-continued $$\int_0^{V_{P,max}} \frac{\gamma_{L,c}(V_P) - 2\sqrt{\gamma_{L,c}(V_P)\gamma_{S,c}(V_P)}}{r_r(V_P)} \exp\{-\beta[\gamma_{L,c}(V_P) - \gamma_{S,c}(V_P)]^2\} dV_P$$

In the Equations (20) and (21), "M" represents the mass of the porous body.

One understands based on the Equation (21) that the maximum dissipated energy of the colloidal damper varies proportionally to the mass "M" of the porous body. Accordingly, it becomes possible to control the damping characteristic of the active-control colloidal damper in accordance with the present invention by adjusting the mass of the porous body during the operation of the colloidal damper. It becomes possible to control the damping characteristic of the active-control colloidal damper in accordance with the present invention also by controlling the mass of the working liquid.

Advantages Provided by the Invention

By designing an active-control colloidal damper to include a cylinder, a piston guided and supported by the cylinder during its reciprocating movement, and defining a closed space in association with the cylinder, a porous body having a large number of pores and being housed in the closed space, a working liquid contained in the closed space together with the porous body, the working liquid flowing into the pores of the porous body during pressurization, and flowing out from the pores of the porous body during depressurization, and a pressure controlling device to control the pressure in the closed space, the active-control colloidal damper is able to actively control its damping characteristic thereof by adjusting the pressure in the closed space.

INDICATION BY REFERENCE NUMERALS

Figure 7:
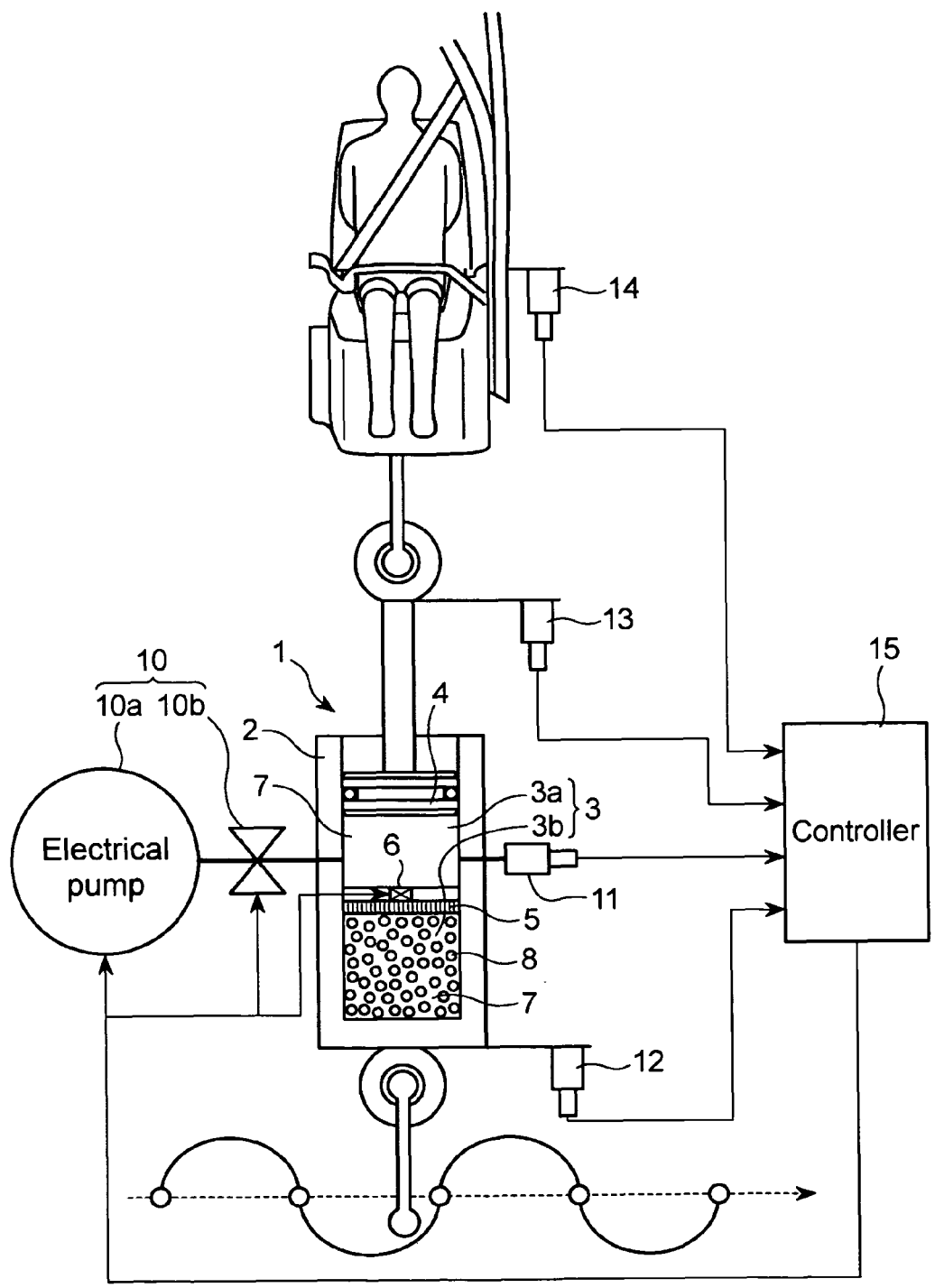
FIG. 7 is a schematic view of the active-control colloidal damper in accordance with an embodiment of the present invention.

1 Active-control colloidal damper
2 Cylinder
3 Closed space
3a, 3b Closed spaces
4 Piston
5 Filter
6 Servo valve
7 Working liquid
8 Porous body
8a Pore
8b Cavity
8c Outer surface of the porous body
8d Inner surface of the pore of the porous body
8e Inner surface of the cavity of the porous body
10 Pumping device
10a Electrical pump
10b Electromagnetic valve
11 Pressure gauge
12, 13, 14 Accelerometer
15 Controller Mode for Reducing the Invention to Practice FIG. 7 is a schematic view of the active-control colloidal damper in accordance with an embodiment of the present invention.

As illustrated in FIG. 7, the active-control colloidal damper 1 in accordance with an embodiment of the present invention, used for an automobile, is comprised of a cylinder 2, a piston 4 guided and supported by the cylinder 2 during its reciprocating movement, and defining a closed space 3 in association with the cylinder 2, a filter 5 acting as a partition wall and dividing the closed space 3 into closed spaces 3a and 3b, and a servo valve 6 controlling the working pressure in the closed space 3, as one of the pressure controlling devices. The closed space 3 contains the working liquid 7 therein, and the porous bodies 8 each having a large number of pores 8a are housed in the closed space 3b situated in the opposite side of the piston 4. The servo valve 6 controls the volume or the pressure of the working liquid 7 flowing between the closed spaces 3a and 3b, and consequently, it is a valve which dynamically controls the volume of the working liquid 7 in the closed space 3b.

The active-control colloidal damper 1 further includes a pumping device 10 as a pressure controlling device to control the initial pressure in the closed space 3, a pressure gauge 11 to measure the pressure in the closed space 3, an accelerometer 12 to measure the acceleration of the cylinder 2, an accelerometer 13 to measure the acceleration of the piston 4, an accelerometer 14 placed on the driver's seat in the automobile on which the active-control colloidal damper 1 is mounted, and a controller 15 that receives the measured pressure and accelerations from the pressure gauge 11 and the accelerometers 12, 13 and 14, and controls the operation of the servo valve 6 and the pumping device 10 in accordance with the received values of the pressure and accelerations. The pumping device 10 is comprised of an electrical pump 10a and an electromagnetic valve 10b. The electrical pump 10a and the closed space 3 are in communication with each other through the electromagnetic valve 10b. The electromagnetic valve 10b is opened only when the working liquid 7 is forced to flow in and out of the closed space 3 by employing the electrical pump 10a.

Figure 1A:
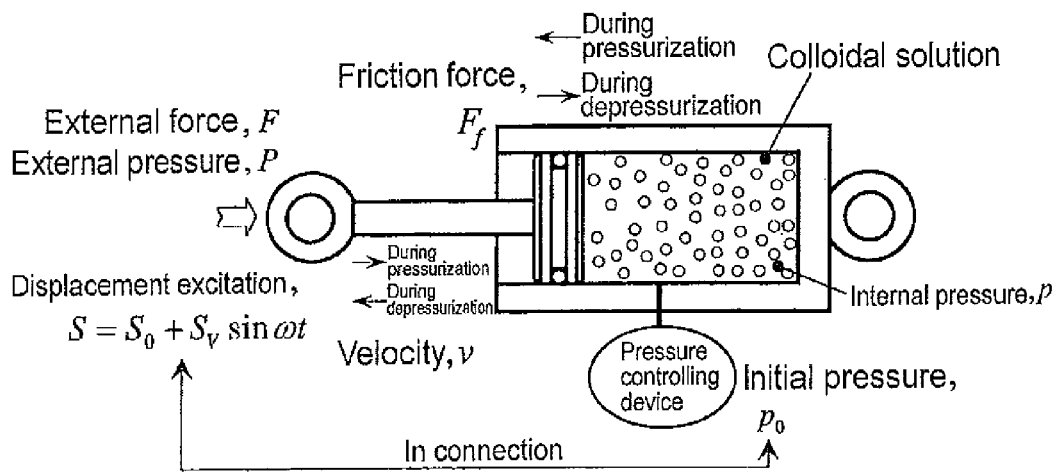
FIG. 1A is a drawing used to explain the working principle of the active-control colloidal damper in accordance with the present invention.
Figure 1B:
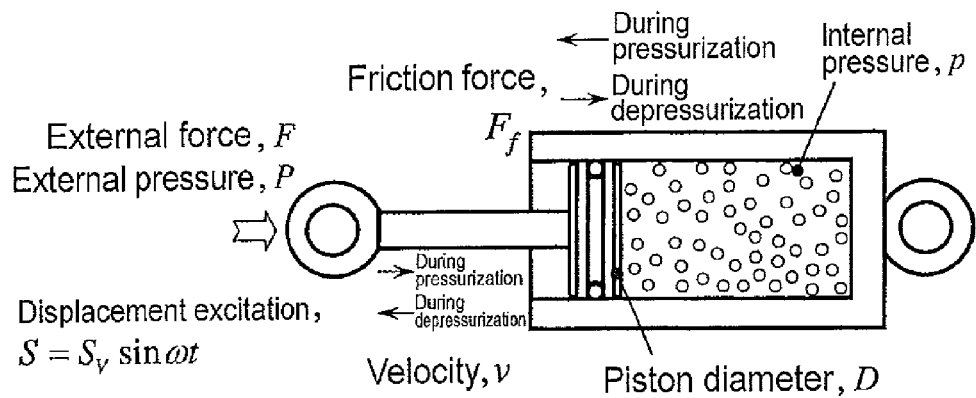
FIG. 1B is a drawing used to explain the working principle of a conventional passive-control colloidal damper.
Figure 2A:
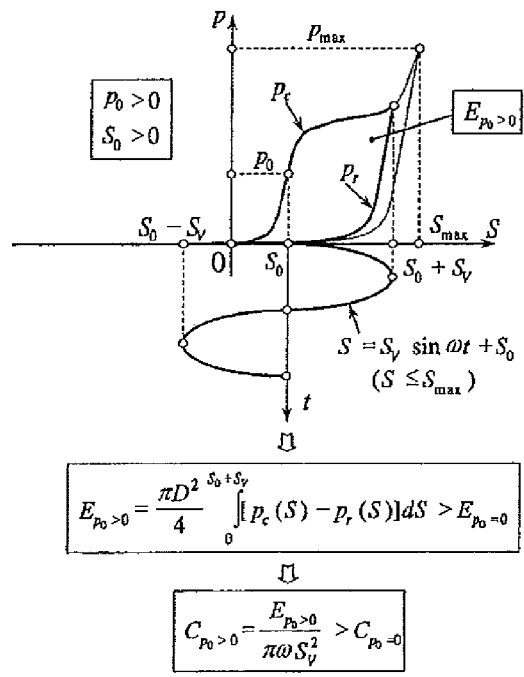
FIG. 2A shows the damping performance found when the initial pressure in the closed space is adjusted by means of the active-control colloidal damper in accordance with the present invention.
Figure 2B:
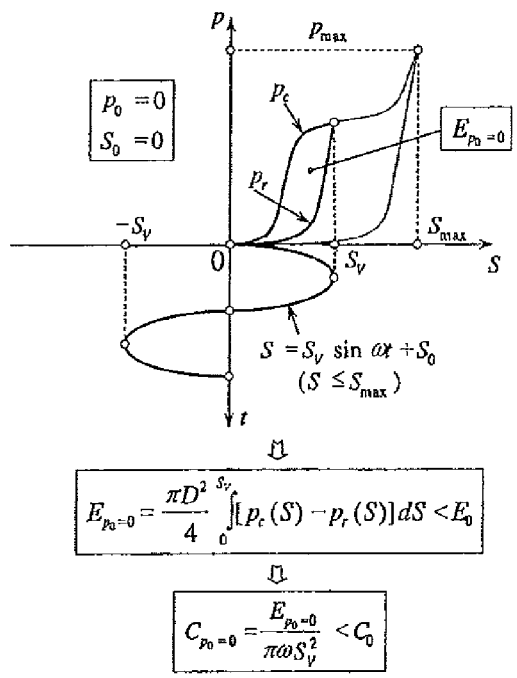
FIG. 2B shows the damping performance of a conventional passive-control colloidal damper.
Figure 3A:
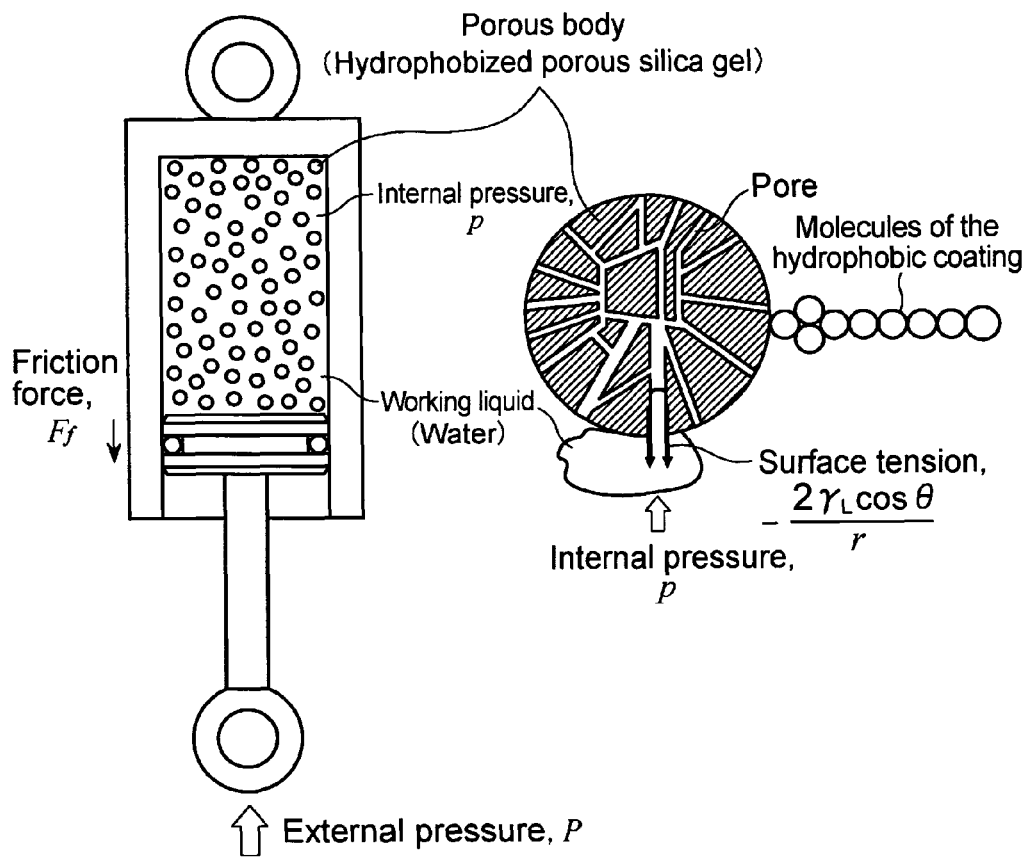
FIG. 3A is a drawing showing the flowing of the working liquid into pores in the case of the active-control colloidal damper in accordance with the present invention.
Figure 3B:
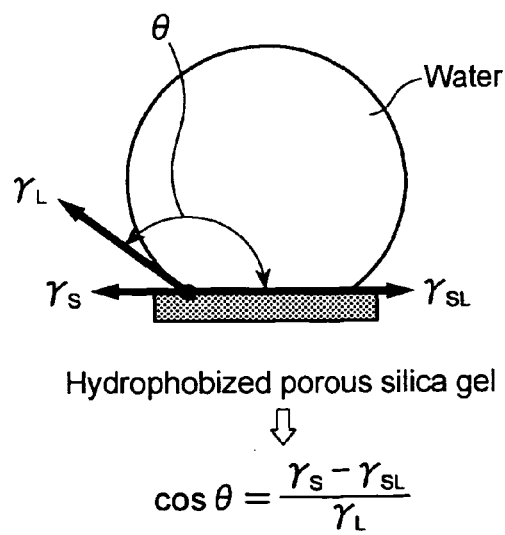
FIG. 3B is a drawing used to explain the wetting phenomenon in the case of hydrophobized porous silica gel.
Figure 8:
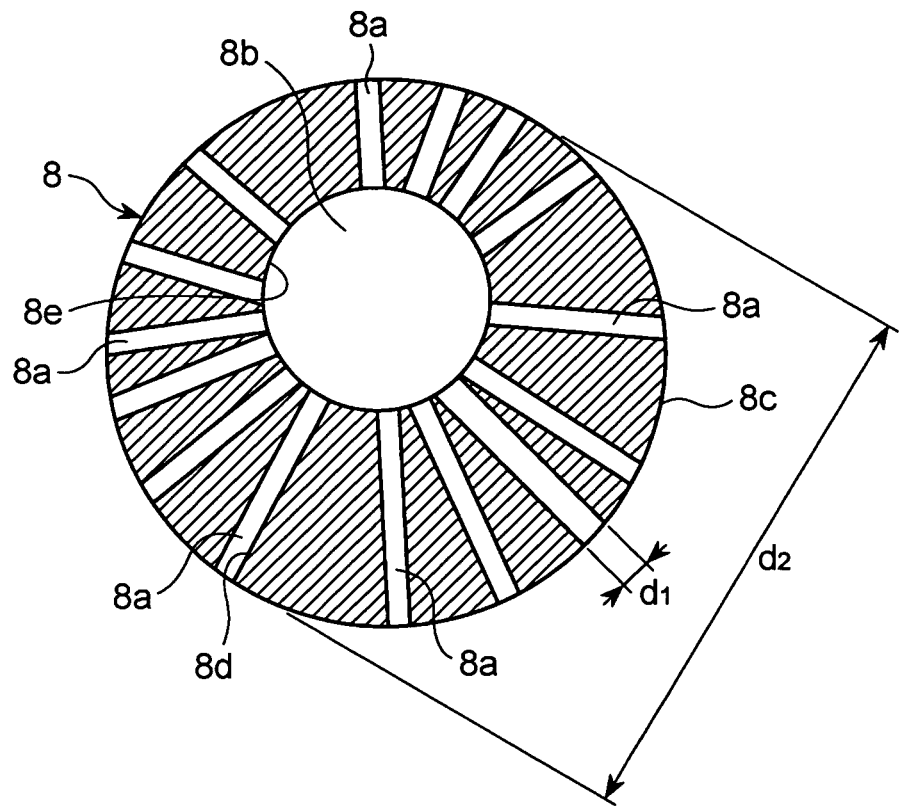
FIG. 8 is a cross-sectional view of the porous body.

FIG. 8 is a cross-sectional view of the porous body 8. The porous body 8 is a substantially quasi-spherical particle of micro-order size (micro-particle) having a diameter in the range of about 1 micrometer to about 100 micrometers, and can be composed of silica gel, aero gel, ceramics, porous glass, zeolite, porous PTFE (polytetrafluoroethylene), porous wax, porous polystyrene, alumina or carbon (including graphite, charcoal, fullerene, and carbon nanotube). The porous body 8 has a large number of nano-order pores (nano-pores) 8a each having a diameter in the range of about 1 nanometer to about 100 nanometers, and a cavity (hollow portion) 8b formed almost in the vicinity of the particle's center. Each of the pores 8a extends almost radially from the cavity 8b towards the outer surface 8c of the porous body 8, and it is open at one end on the inner surface of the cavity 8e of the porous body 8, and at the other end on the outer surface 8c of the body 8. The porous body (hydrophobized porous silica gel) illustrated in FIG. 3A is an exceptional example of porous body 8 in which the cavity 8b is omitted.

Figure 9:
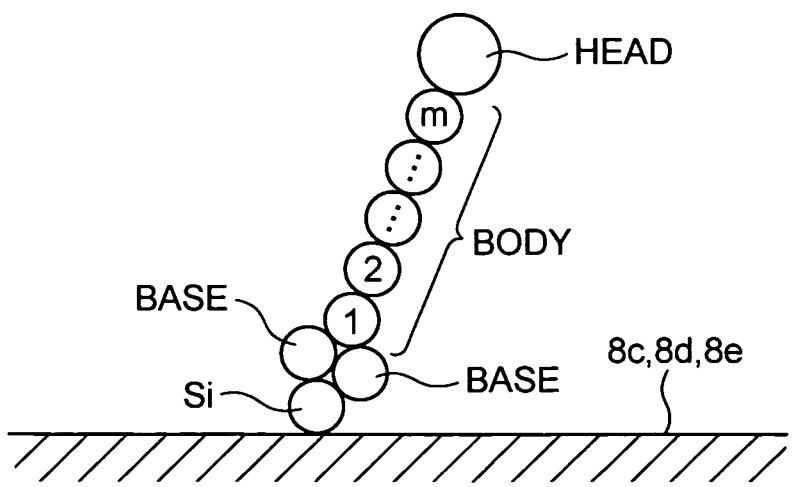
FIG. 9 is an enlarged view of the surface of the porous body.

The outer surface 8c of each of the porous bodies 8, the inner surface 8d of each of the pores 8a, and the inner surface 8e of the cavity 8b have no affinity for (are lyophobic relative to) the working liquid 7, and the lyophobic material consists of linear molecular chains. For instance, they are covered with a material such as —Si-(BASE)$_2$-(BODY)$_m$-(HEAD) (see FIG. 9), in which case, "m" is in the range of 0 to 23, where possible combinations of (BODY) and (HEAD) are as follows.

[(BODY), (HEAD)]=[CH$_2$, CH$_3$], [CF$_2$, CF$_3$], [OSi (CH$_3$)$_2$, OSi(CH$_3$)$_3$] or [OSi(CF$_3$)$_2$, OSi(CF$_3$)$_3$]. A base (BASE) has a molecular chain with a length shorter than that corresponding to the main chain-(BODY)$_m$-(HEAD), and it is comprised of either an alkyl group, having a number of carbon atoms in the range of 1 to 3, or a phenyl group.

The working liquid 7 is required to have high surface tension, and is preferably water. Except water, the working liquid may be comprised of a mixture of water and antifreeze liquid, for instance, water containing at least one or more antifreeze agents such as ethanol, ethylene glycol, propylene glycol and glycerin, reaching a concentration up to 67 volume %, in which case, the active-control colloidal damper 1 can be used to operate in an environment with temperatures of 0 (zero) degree centigrade or lower. As an alternative, there may be used a mixture of water and a liquid which has a higher vaporization point than water, such as dimethylformamide or formamide, in which case, the active-control colloidal damper 1 can be used to operate in an environment with temperatures of 100 degrees centigrade or higher. As another alternative, there may be used a mixture of water and antifoaming agent, for instance, water containing at least one or more antifoaming agents such as silicon-based antifoaming agents, antifoaming agents without silicon, and oily antifoaming agents, reaching a concentration up to 50 ppm, in which case, the active-control colloidal damper 1 can be used to operate even if air penetrates the closed space 3 through the seal. The average inner diameter "d1" of the pore 8a is decided to satisfy the condition that the Knudsen number, defined as $K_n = L_p/(d1 \times \frac{1}{2})$, is larger or equal to 0.034, but smaller or equal to 0.119 (preferably 0.097), wherein "$L_p$" represents the mean free path of the molecules of the working liquid. The average outer diameter "d2" of the porous body 8 is decided to satisfy the condition that "d2" is equal to or larger than 10×"d1" (average inner diameter of the pore 8a), but smaller than 100,000×"d1".

As already mentioned, the porous bodies 8 are contained only into a space situated below the filter 5 in FIG. 7, that is, only in the closed space 3b situated in the opposite side of the piston 4. The filter 5 has a number of pores each having a diameter (ranging from about 0.1 micrometer to about 10 micrometers) smaller than the average outer diameter "d2" of the porous body 8. In this way the porous bodies 8 are not allowed to pass through, and only the working liquid 7 is allowed to pass through the filter's pores. Thus, the pores of the filter 5 isolate the porous bodies 8 from a frictional region that occurs at the relative movement between the piston 4 and the cylinder 2, and allow only the working liquid 7 to move between the closed spaces 3a and 3b.

The porous bodies 8 and the working liquid 7 are contained in the closed space 3 in such a way that the ratio $MV_P/V_L$ is equal to or larger than 0.2, but equal to or smaller than 2.5, where $MV_P$ represents the total volume of the pores 8a or the porous bodies 8 (M (mass of the porous bodies 8)×$V_P$ (specific volume of the pores 8a of the porous body 8)), and $V_L$ represents the volume of the working liquid 7. In the instant embodiment, the porous bodies 8 and the working liquid 7 are accommodated in the closed space 3 in such a way that the $MV_P/V_L$ is substantially equal to one (1).

In the case of the active-control colloidal damper 1 having the above-mentioned structure, when an external force F is applied on the piston 4, the external force F is partially turned into the friction force $F_f$ that acts on lateral area of the piston 4, and partially dissipates the mechanical energy through the frictional process. However, the main part of the external force F, that is $0.25\pi D^2 p$, is applied via the frontal area of the piston 4 on the working liquid 7, producing the pressurization of the working liquid 7. Thus, the pressurized working liquid 7 flow-into the pores 8a of the porous bodies 8 placed into the closed space 3a and such flow-into the pores 8a is against the action of the surface tension. As a result, the piston 4 moves in such a direction that the volume of the closed space 3b is reduced. If the energy $E_f$ dissipated by the frictional process is ignored, one concludes that in the case of the active-control colloidal damper 1, since the energy of vibration and/or impact (shock) derived from the external force F is consumed by the working liquid 7 flowing into the pores 8a, the external force F which moves the piston is attenuated.

On the other hand, if the external force F stops to act on the piston 4, the working liquid 7 that has flown into the pores 8a of the porous bodies against the surface tension, due the same action of the surface tension is forced to flow-out from the pores 8a of the porous bodies. As a result, the piston 4 moves in such a direction that the volume of the closed space 3b increases, and thus, the piston returns to its initial position. In such circumstances, the porous bodies 8 cannot pass through the pores of the filter 5, and hence, they are contained in the closed space 3b, and only the working liquid 7 passes through the pores of the filter 5. Thus, since the porous bodies 8 do not penetrate into the closed space 3a, in the case of the active-control colloidal damper 1, it becomes possible to prevent the porous bodies 8 from entering into the frictional region that occurs at the relative movement between the piston 4 and the cylinder 2.

Next one explains the active control of the damping characteristic of the active-control colloidal damper 1 in accordance with the instant embodiment.

First, one explains the ride-comfort factor (K factor) used to evaluate the riding quality of an automobile. The ride-comfort factor is a numerical parameter to express the riding quality of an automobile, as felt by a passenger during the travel. The ride-comfort factor is depending on the transfer function H(f) of the automobile's suspension, which can be obtained by replacing the complex structure of an automobile by a simplified vibration model. The ride-comfort factor is also influenced by the sensitivity G(f) of the passenger to vibrations, and by the power spectrum density R(f) of the rough road. The ride-comfort factor can be calculated in accordance with the Equation (22).

$$K = 20 \sqrt{\sum_m [|G(f)|^2 \cdot |H(f)|^2 \cdot R(f) \cdot \Delta f]_m} \quad (22)$$

In the Equation (22), "$f = \omega/(2\pi) = V/\lambda$" represents the number of oscillations (frequency), and "$\Delta f$" represents the frequency intervals to be used in calculus of the ride-comfort factor.

Figure 10:
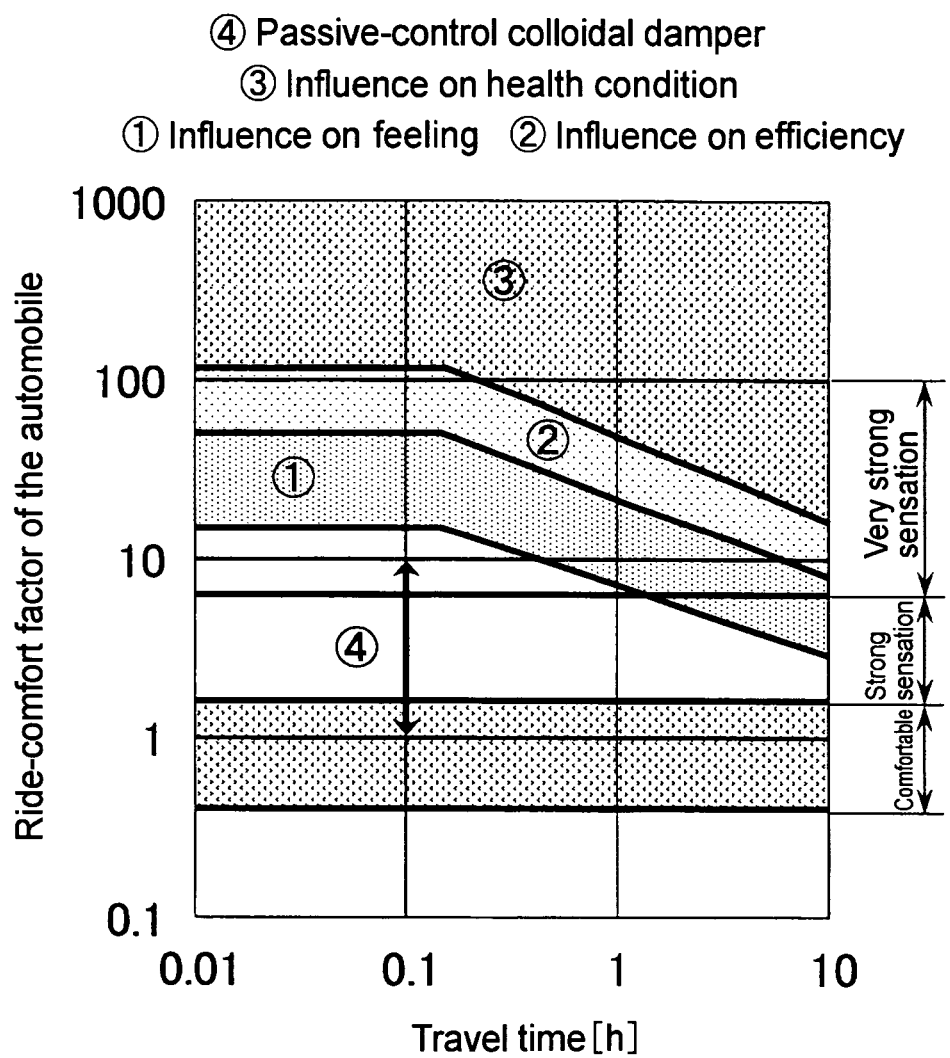
FIG. 10 is a graph showing the relation between the ride-comfort factor and the travel period of time of an automobile.

FIG. 10 is a graph showing the relation between the ride-comfort factor and the travel period of time of an automobile.

In the case of the conventional passive-control colloidal damper used for an automobile, it is not possible to adjust the damping coefficient according to the displacement excitation produced by the surface roughness of a normal road, highway, etc. As a result, as illustrated in FIG. 10, it is not possible to efficiently dissipate the energy of vibration, and hence, the ride-comfort factor of the automobile varies in the range from 1 to 10, and consequently, if the travel with the automobile is for a long period of time, the passenger's feeling is harmfully influenced (discomfort sensation, sickness, nausea). In light of this problem, the active-control colloidal damper 1 in accordance with the instant embodiment is designed to include a controller 15 used to adjust the initial pressure inside the cylinder 2, and thereby the damping coefficient is dynamically adjusted in such a way that the ride-comfort factor of the automobile varies in a comfortable range, specifically, in the range from 0.4 to 1.6.

As already mentioned, the active-control colloidal damper 1 in accordance with the instant embodiment is designed to include the controller 15 which is used to control the operation of the servo valve 6 and the pumping device 10 in accordance with the values of the pressure and accelerations measured by the pressure gauge 11 and the accelerometers 12, 13 and 14. The controller 15 is comprised of a computer executing the control programs, such as the module for processing the measured data, the module for computing the damping coefficient, the module for computing the ride-comfort factor of the automobile, the feedback control module, etc.

In the case of the active-control colloidal damper 1, the pressure gauge 11 measures the pressure inside the cylinder 2, the measured pressure becoming an INPUT value of the controller 15. Additionally, in the case of the active-control colloidal damper 1, by using the accelerometers 12, 13 and 14 the acceleration is measured at three different locations, the measured accelerations becoming also INPUT values of the controller 15. Based on the INPUT values of the measured pressure and accelerations, the controller 15 calculates in real time the damping coefficient C and the ride-comfort factor K of the automobile.

Then, the control program executed by the controller 15 calculates the damping coefficient $C_{p0>0}$ which is necessary to produce a variation of the ride-comfort factor in the comfortable range of 0.4 to 1.6, and thereby, it calculates the necessary initial pressure $p_0$ in accordance with the relationship between the damping coefficient and the initial pressure, given by the Equation (6). The feedback control module executed by the controller 15 produces an OUTPUT signal which is the difference between the initial pressure measured by the pressure gauge 11 and the initial pressure calculated by the control program, and this signal transmitted from the controller 15 becomes an INPUT signal for the electrical pump 10a and the electromagnetic valve 10b which are both elements of the pumping device 10, and also for the servo valve 6. Thus, it becomes possible to automatically control the discharge of the electric pump 10a and to automatically control the open/close action of the electric valve 10b and the servo valve 6, and in this way it becomes possible to adjust the initial pressure to a desired initial pressure $p_0$.

Furthermore, since the active-control colloidal damper 1 in accordance with the instant embodiment is designed to include the servo valve 6 controlling the flow-rate (volume) or the pressure of the working liquid 7 flowing between the closed spaces 3a and 3b partitioned by the filter 5, it is possible to adjust the opening degree of the servo valve 6 in the same way as in the case of the pumping device 10, and consequently, by dynamic control of the volume of the working liquid 7 existing in the closed space 3b, it becomes possible to adjust the initial pressure to a desired initial pressure $p_0$. It should be noted that since the active-control colloidal damper 1 includes the filter 5 which has the only purpose to prevent the porous bodies 8 from flowing into a frictional region that occurs at the relative movement between the piston 4 and the cylinder 2, the filter 5 has nothing to do with the dynamic control of the initial pressure $p_0$, and hence, it is also possible to omit the filter 5.

Although not illustrated, the active-control colloidal damper 1 in accordance with the instant embodiment, concerning the pressure controlling device, may be designed in such a way that instead of the pumping device 10, to include an ultrasonic wave generator which, as elastic waves applied to the cylinder 2, excites ultrasonic waves. If ultrasonic waves are excited on the cylinder 2, bending waves are excited, through the cylinder 2, on the walls of the pores 8a of the porous bodies 8, and thus, an acoustic radiation pressure "$p_{rad}$" acts on the working liquid 7. Thus, by designing the controller 15 to control the ultrasonic wave generator to obtain the desired acoustic radiation pressure "$p_{rad}$", it becomes possible to control the initial pressure $p_0$, and thereby, to control the damping characteristic of the active-control colloidal damper 1.

Alternatively, as elastic waves applied to the cylinder 2, acoustic waves may be excited. Also, instead of exciting elastic wave to the working liquid 7 and the porous bodies 8 through the cylinder 2, it is possible to use a configuration in which the elastic waves are excited directly to the working liquid 7 and the porous bodies 8. Briefly, regardless the means for acquiring the excitation, if the porous bodies 8 or the working liquid 7 are excited to obtain the desired acoustic radiation pressure "$p_{rad}$", then, it becomes possible to adjust the initial pressure $p_0$, and in this way to control the damping characteristic of the active-control colloidal damper 1.

Figure 6:
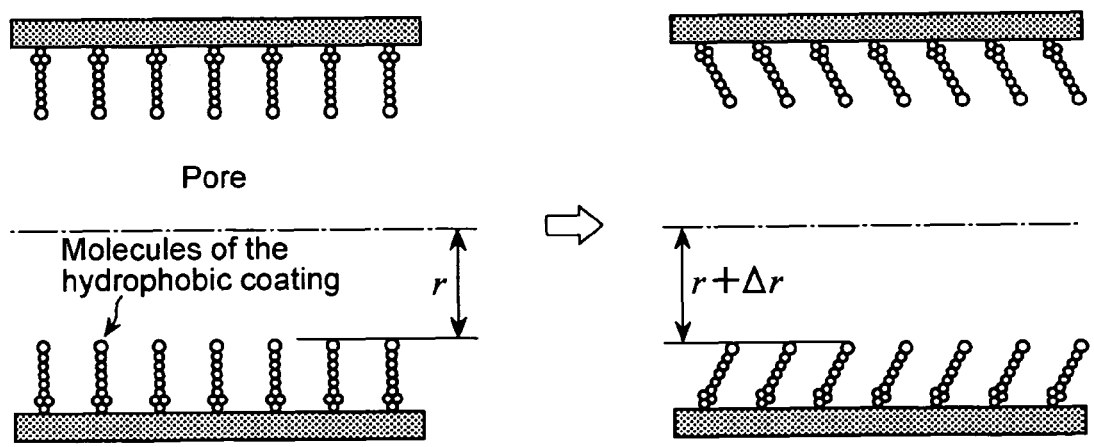
FIG. 6 is a drawing used to explain how the radius of a pore varies due to rotation, extension or contraction of the molecules of the hydrophobic coating.

Although not illustrated, the active-control colloidal damper 1 in accordance with the instant embodiment, concerning the pressure controlling device, may be designed to include an irradiating device of light or ultraviolet rays, as an inner-diameter controlling device to control the inner diameter of the pores 8a of the porous bodies 8. As mentioned above, the porous bodies 8 are hydrophobized by treating the surface with lyophobic material consisted of linear molecular chains, which produce a hydrophobic coating. By irradiating with light or ultraviolet rays the molecules of the hydrophobic coating, the molecules of the hydrophobic coating can be rotated, extended or contracted, as illustrated in FIG. 6. Thus, since it becomes possible to controllably change the thickness of the hydrophobic coating, it is possible to adjust the radius of the pores 8a, and hence, it becomes possible to control the damping characteristic of the active-control colloidal damper 1.

Although not illustrated, the active-control colloidal damper 1 in accordance with the instant embodiment, concerning the pressure controlling device, may be designed to include a mass controlling device to control the mass of the porous bodies 8 and/or the working liquid 7. The mass controlling device has a construction similar to that of the pumping device 10, namely, it employs a mechanism that produces an in-flow or out-flow of the porous bodies 8 or the working liquid 7 from the exterior of the cylinder 2 to the interior of the closed space 3, and in this way, during the operation of the active-control colloidal damper 1 the mass of the porous bodies 8 and/or the working liquid 7 can be adjusted, and thus, it becomes possible to control the damping characteristic of the active-control colloidal damper 1.

Although not illustrated, the active-control colloidal damper 1 in accordance with the instant embodiment, concerning the pressure controlling device, may be designed to include in the cylinder 2 a surface-tension controlling device to control the surface tension of the working liquid 7 and/or the surface tension of the porous bodies 8. The surface-tension controlling device may be comprised of an electric-field controlling device to control the electric field in the closed space 3, a magnetic-field controlling device to control the magnetic field in the closed space 3, or a temperature controlling device to control the temperature of the porous bodies 8 and/or the working liquid 7 accommodated in the closed space 3. Additionally, concerning the working liquid 7, a surfactant having a reversible oxidation-reduction characteristic can be mixed in the working liquid 7, in which case, the surface-tension controlling device may be comprised of an electrochemical controlling device to control the reversible oxidation-reduction characteristic of the surfactant. As an alternative, concerning the working liquid 7, a surfactant exhibiting a reversible photoisomerization characteristic when irradiated by light or ultraviolet ray can be mixed in the working liquid 7, in which case, the surface-tension controlling device may be comprised of an irradiating device to irradiate by light or ultraviolet ray the surfactant, and in this way to control the reversible photoisomerization characteristic of the surfactant.

Since the active-control colloidal damper 1 in accordance with the instant embodiment controls the surface tension of the working liquid 7 and/or the surface tension of the porous bodies 8 by employing the above-mentioned surface-tension controlling devices, it is able to vary the pressure in the closed space 3 as shown by the Equation (13), and consequently, it becomes possible to control the damping characteristic of the active-control colloidal damper 1.

Additionally, as previously mentioned, since the active-control colloidal damper 1 in accordance with the instant embodiment is able to control the quantity (volume) of the working liquid 7 existing in the closed space 3 in the cylinder 2, by adjusting the quantity (volume) of the working liquid 7, it becomes possible to control the initial position of the piston 4, and thus, it becomes also possible to control the height of the automobile. Furthermore, even if the working liquid 7 leaks out of the closed space 3 during exploitation, when the maintenance of the automobile is performed, it is possible to replenish (supplement) the working liquid 7.

EXAMPLES

Figure 11A:
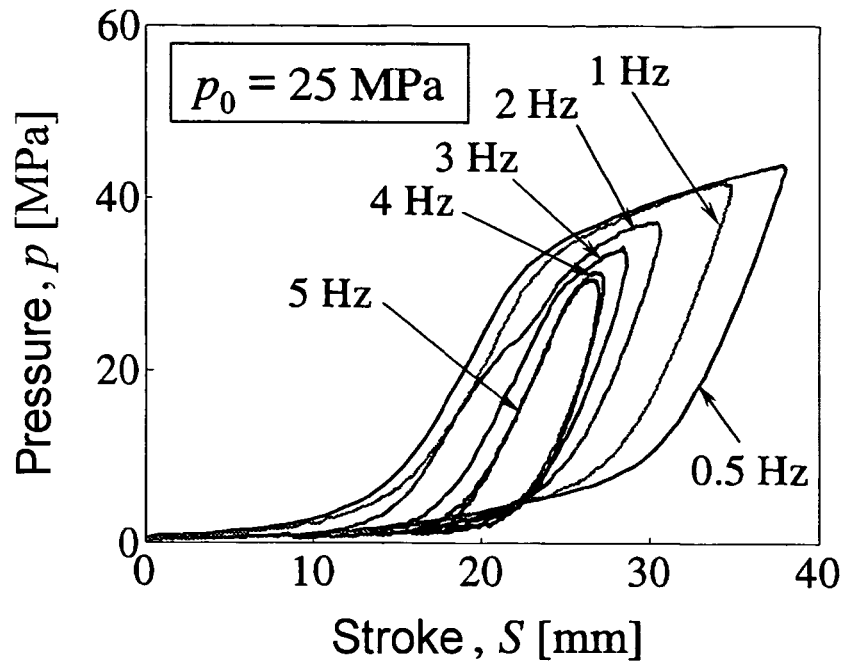
FIG. 11A is a graph showing the hysteresis (the influence produced by the colloidal solution) of the active-control colloidal damper in the case when the initial pressure is equal to 25 MPa.
Figure 11B:
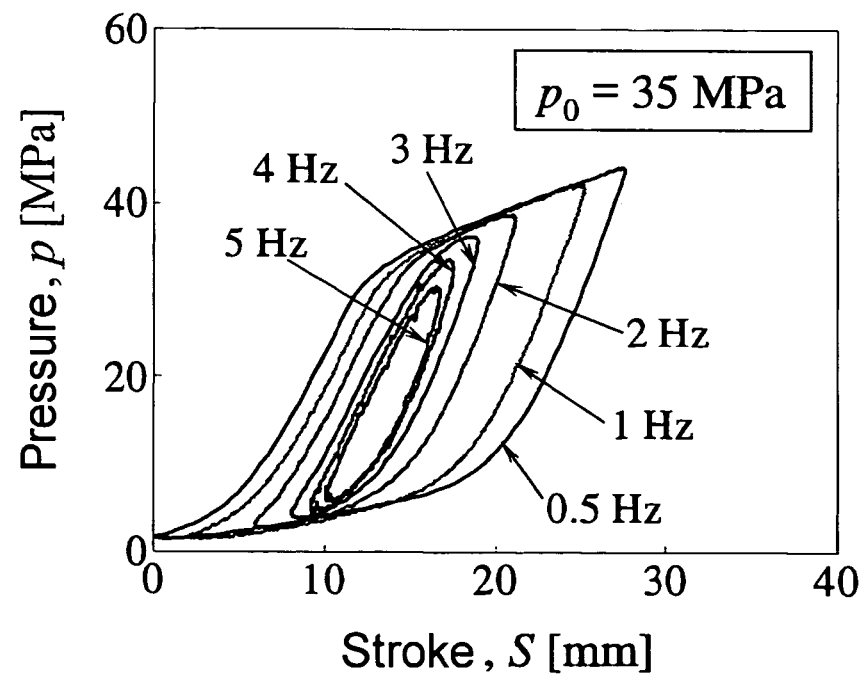
FIG. 11B is a graph showing the hysteresis (the influence produced by the colloidal solution) of the active-control colloidal damper in the case when the initial pressure is equal to 35 MPa.
Figure 12:
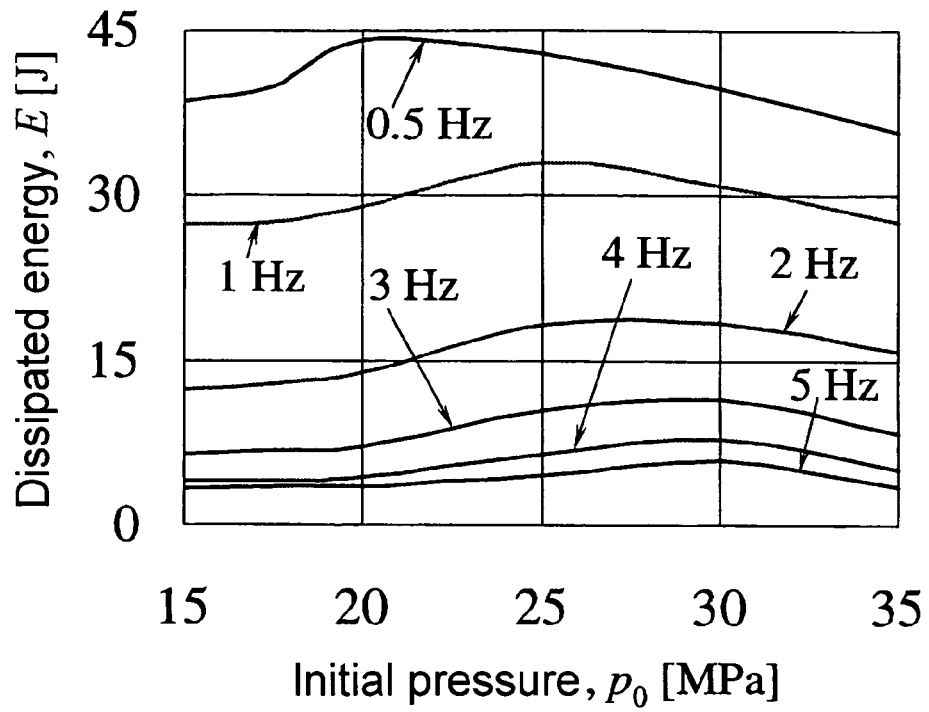
FIG. 12 is a graph showing the relation between the dissipated energy of the active-control colloidal damper and the initial pressure.
Figure 13:
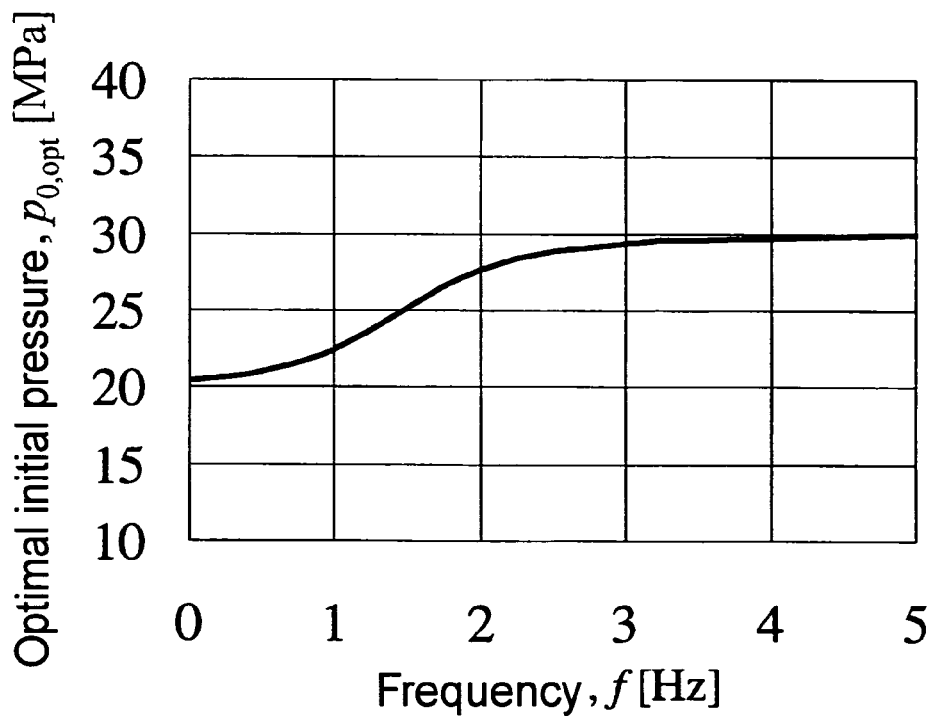
FIG. 13 is a graph showing the relation between the optimal initial pressure and the frequency.

The active control of the damping characteristic of the active-control colloidal damper 1, to be achieved by adjusting the initial pressure, was experimentally confirmed. FIG. 11A is a graph showing the hysteresis (the influence produced by the colloidal solution) of the active-control colloidal damper 1 in the case when the initial pressure is equal to 25 MPa, and FIG. 11B is a graph showing similar results in the case when the initial pressure is equal to 35 MPa. FIG. 12 is a graph showing the relation between the dissipated energy of the active-control colloidal damper 1 and the initial pressure. From FIG. 12 one understands that since the dissipated energy changes at the variation of the initial pressure, it becomes possible to control the damping characteristic of the active-control colloidal damper 1 with respect to the initial pressure. For each frequency, the pressure at which the dissipated energy attains a maximum value, represents an optimal initial pressure $p_{0,opt}$. FIG. 13 is a graph showing the relation between the optimal initial pressure and the frequency.

Then, one considers the sensitivity coefficient of the active-control colloidal damper 1. First of all, as a first definition of the sensitivity coefficient, it can be defined as the fluctuation of the dissipated energy relative to the maximum dissipated energy.

Sensitivity coefficient (First definition)=$\Delta E/E_{max}$=1−$E$ $(p_{0,0})/E_{max}$[−] (23)

As a second definition of the sensitivity coefficient, it can be defined as the fluctuation of the dissipated energy relative to the fluctuation of the initial pressure.

Sensitivity coefficient (Second definition)=−$\Delta E/\Delta p_0$= $[E_{max}-E(p_{0,0})]/(p_{0,opt}-p_{0,0})$[J/MPa], ($p_{0,0}$=15 MPa) (24)

Figure 14A:
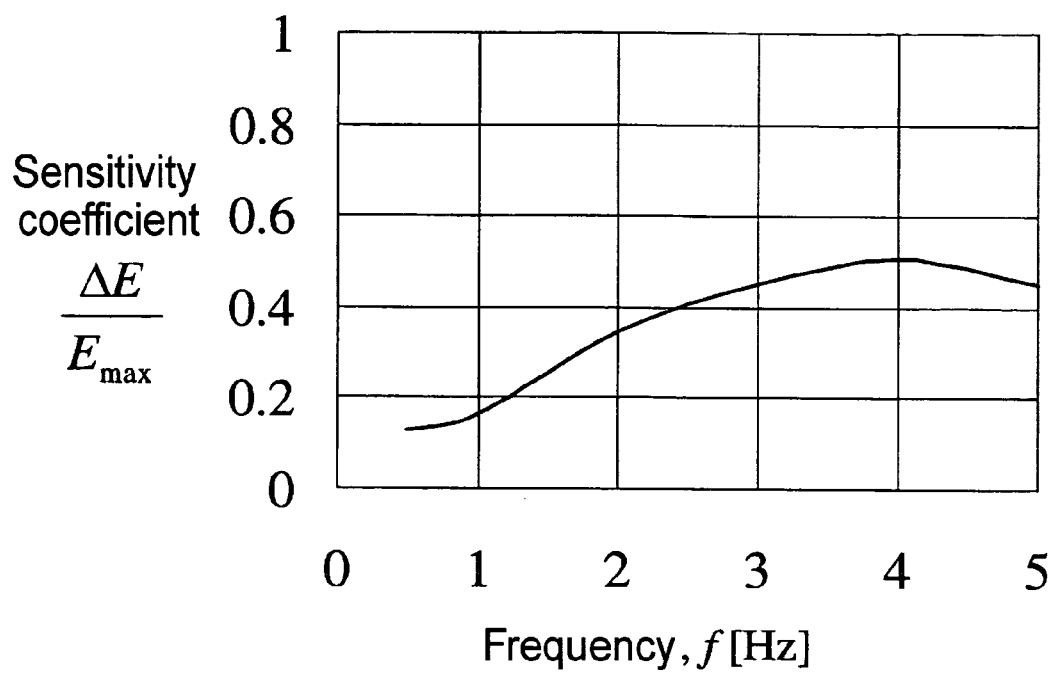
FIG. 14A is a graph showing the relation between the sensitivity coefficient and the frequency, where the sensitivity coefficient is defined as the fluctuation of the dissipated energy relative to the maximum dissipated energy.
Figure 14B:
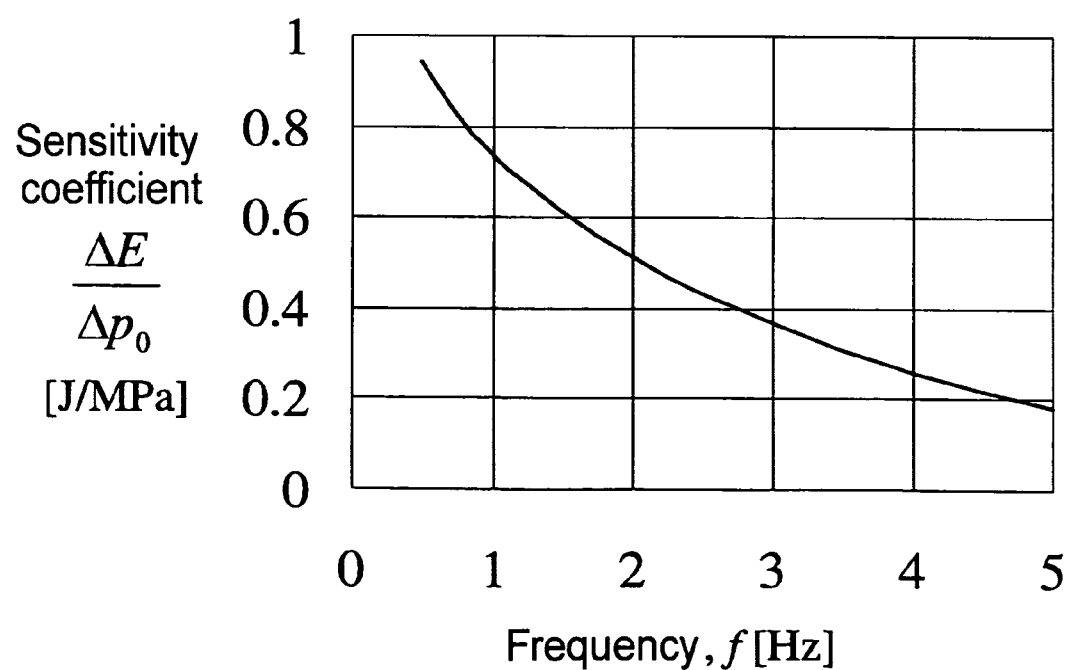
FIG. 14B is a graph showing the relation between the sensitivity coefficient and the frequency, where the sensitivity coefficient is defined as a fluctuation of the dissipated energy relative to the fluctuation of the initial pressure.

Variations against frequency of the sensitivity coefficients are shown in FIG. 14A (first definition) and in FIG. 14B (second definition).

Figure 15A:
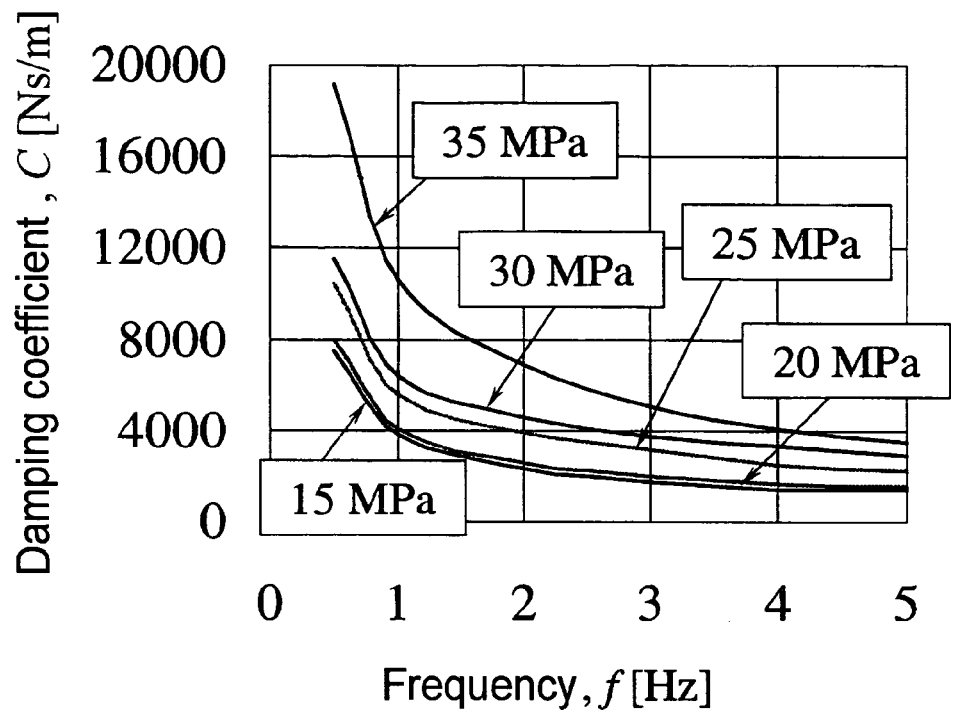
FIG. 15A is a graph showing the relation between the damping coefficient of the active-control colloidal damper and the frequency.
Figure 15B:
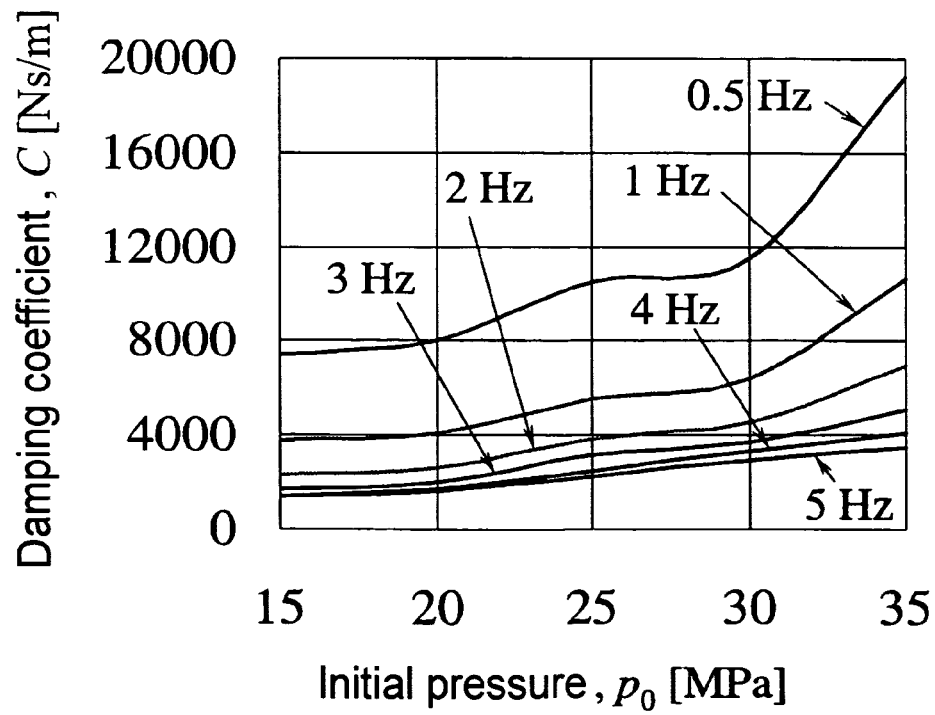
FIG. 15B is a graph showing the relation between the damping coefficient of the active-control colloidal damper and the initial pressure.
Figure 16A:
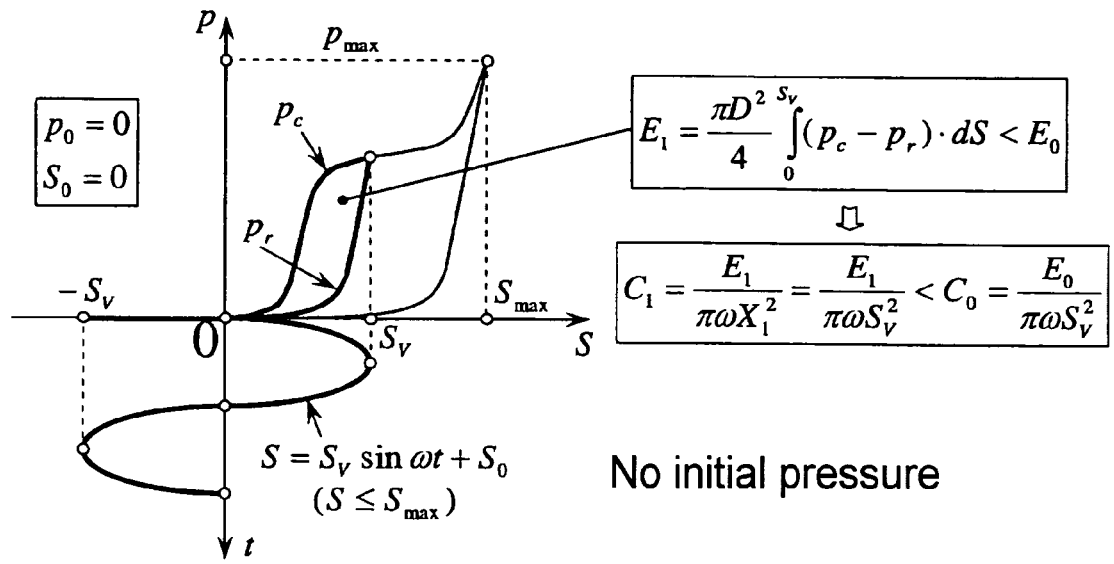
FIG. 16A is a graph showing the relation between the damping characteristic of the active-control colloidal damper and the initial pressure (no initial pressure).
Figure 16B:
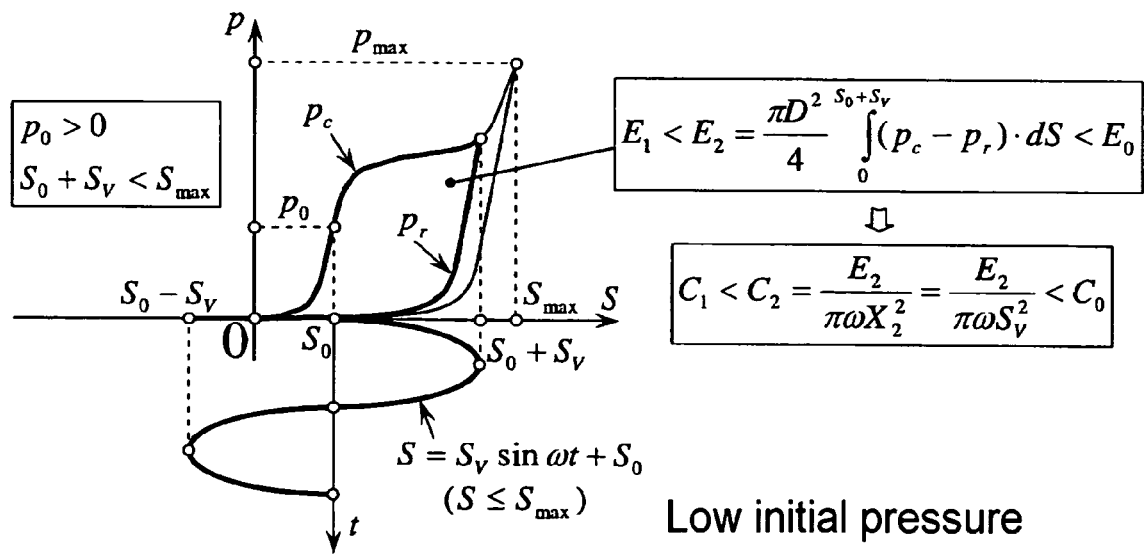
FIG. 16B is a graph showing the relation between the damping characteristic of the active-control colloidal damper and the initial pressure (low initial pressure).
Figure 16C:
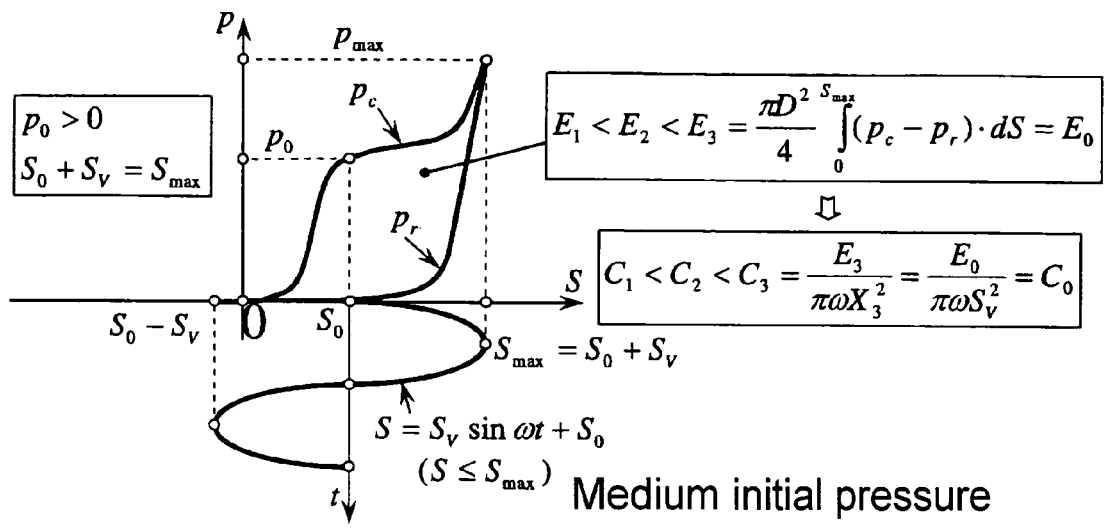
FIG. 16C is a graph showing the relation between the damping characteristic of the active-control colloidal damper and the initial pressure (medium initial pressure).
Figure 16D:
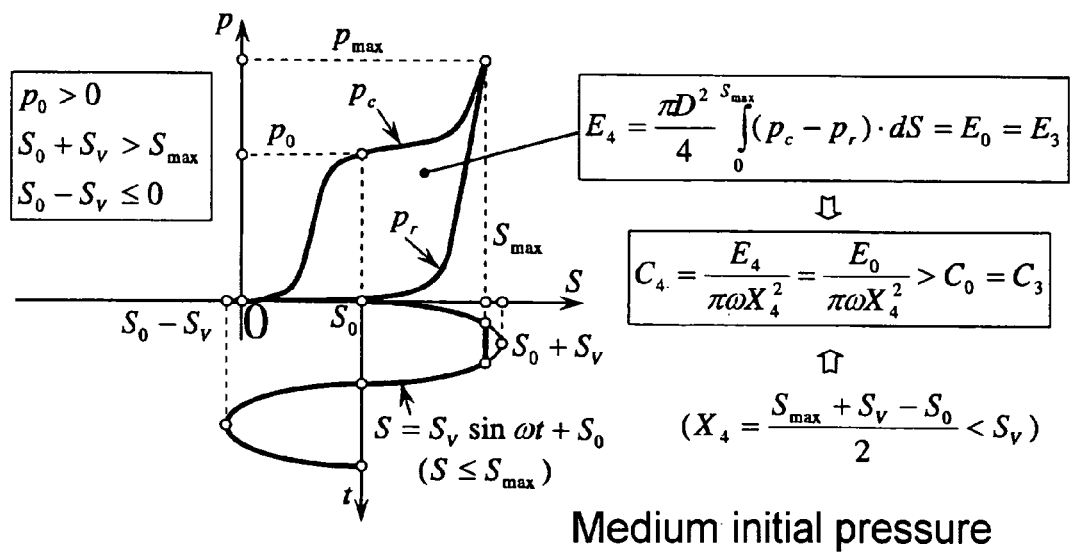
FIG. 16D is a graph showing the relation between the damping characteristic of the active-control colloidal damper and the initial pressure (medium initial pressure).
Figure 16E:
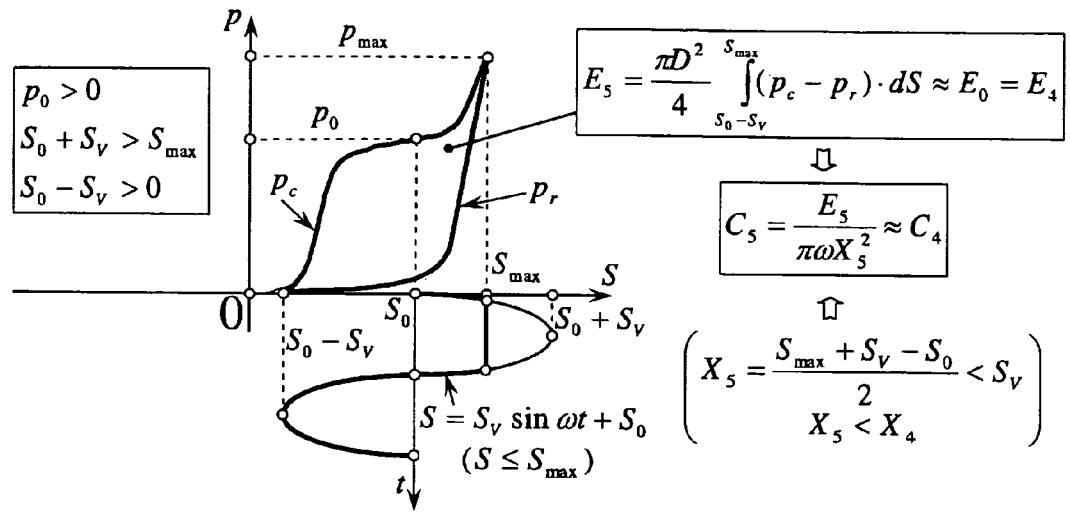
FIG. 16E is a graph showing the relation between the damping characteristic of the active-control colloidal damper and the initial pressure (medium initial pressure).
Figure 16F:
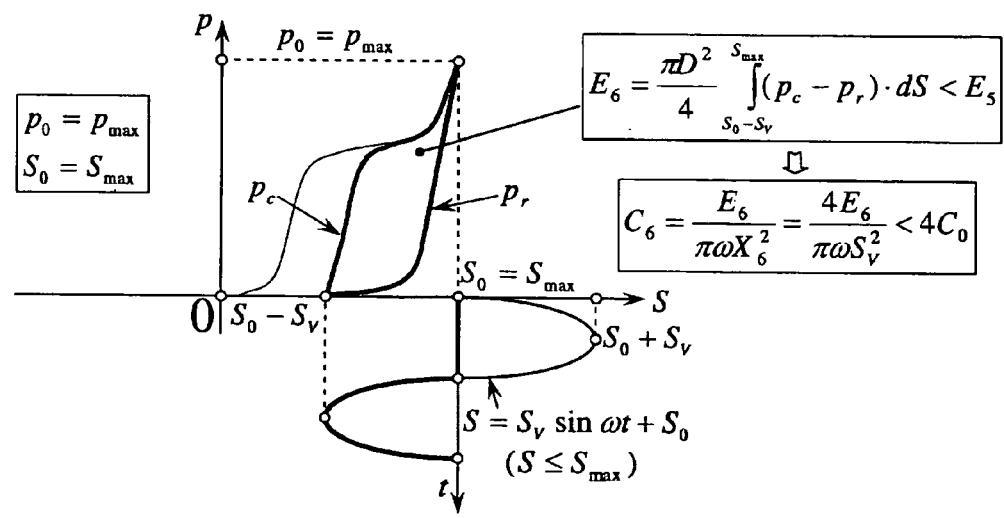
FIG. 16F is a graph showing the relation between the damping characteristic of the active-control colloidal damper and the initial pressure (high initial pressure).

FIG. 15A illustrates the relation between the damping coefficient of the active-control colloidal damper 1 and the frequency, and FIG. 15B illustrates the relation between the damping coefficient of the active-control colloidal damper 1 and the initial pressure. It is obvious from FIG. 15B that the damping coefficient considerably changes as the initial pressure varies, and accordingly, it becomes clear that the damping characteristic of the active-control colloidal damper 1 can be controlled with respect to the initial pressure.

Next, one explains the phenomenological relation between the damping characteristic of the active-control colloidal damper 1 in accordance with the present invention and the initial pressure. During the vibration experiment, concerning the displacement excitation, a sinusoidal wave such as $S=S_0+S_V\sin\omega t$ ("t" represents the time, "$S_V$" represents the amplitude (of the stroke), "$S_0$" represents the initial (start) position, and "$\omega=2\pi f$" represents the circular frequency) is excited, and concerning the experimental conditions, in order to not exceed an imposed maximum pressure $p_{max}$ (an imposed maximum damping force) ($p \leq p_{max}$), the sinusoidal wave of the stroke should not exceed the position $S_{max}$ (truncation of the stroke at $S_{max}$) ($S \leq S_{max}$). In order to obtain the decided (predetermined) initial pressure $p_0$ inside the cylinder 2, inside the cylinder 2 one injects water which is considered here as the working liquid 7. A part of the water is adsorbed into the pores 8a of the porous bodies 8. Concerning the relation between the initial pressure $p_0$ and an initial position $S_0$, it is depending on the internal structure of the porous bodies 8 and/or the distribution of the diameter size of the pores 8a. In the case when water is used as the working liquid 7, the initial pressure $p_0$ in the closed space 3 is in the range from 15 to 35 MPa.

Figure 17:
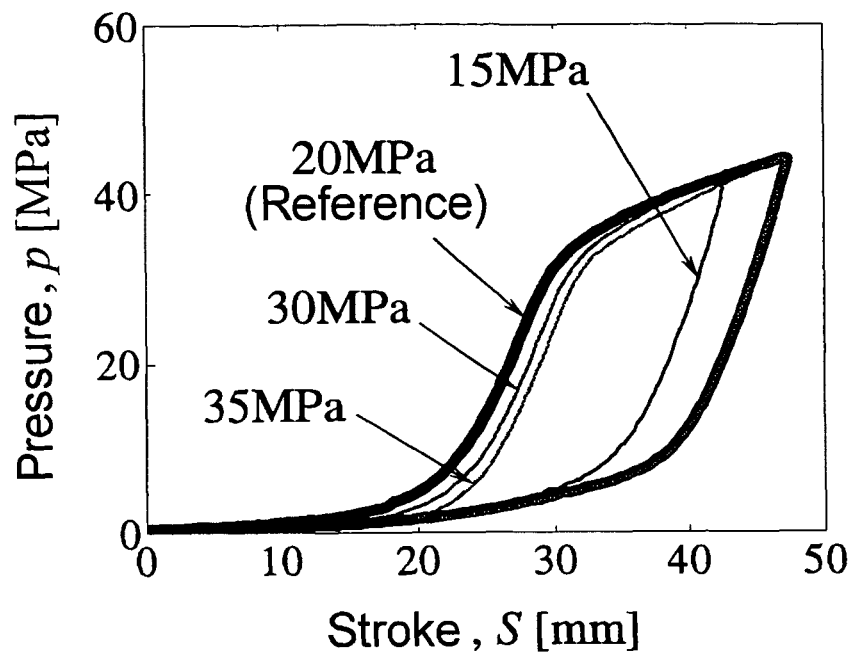
FIG. 17 is a graph showing the experimental hysteresis for various initial pressures in the case when the frequency "f" is equal to 0.5 Hz (f=0.5 Hz).

FIGS. 16A to 16F show the relation between the damping characteristic of the active-control colloidal damper 1 and the initial pressure. Specifically, the initial pressure is equal to zero in FIG. 16A ($p_0$=0, $S_0$=0), the initial pressure is low in FIG. 16B ($p_0$>0, $S_0+S_V<S_{max}$), the initial pressure is medium in FIG. 16C ($p_0$>0, $S_0+S_V=S_{max}$), the initial pressure is medium in FIG. 16D ($p_0$>0, $S_0+S_V>S_{max}$, $S_0-S_V\leq 0$), the initial pressure is medium in FIG. 16E ($p_0$>0, $S_0+S_V>S_{max}$, $S_0-S_V>0$), and the initial pressure is high in FIG. 16F ($p_0=p_{max}$, $S_0=S_{max}$). FIG. 17 is a graph showing the experimental hysteresis for various initial pressures shown in FIGS. 16A to 16F in the case when the frequency "f" is equal to 0.5 Hz (f=0.5 Hz).

The damping characteristics of the active-control colloidal damper 1, namely, the dissipated energy E and the damping coefficient C are calculated in accordance with the equations (25).

$$E = \frac{\pi D^2}{4} \oint p(S) dS; \quad C = \frac{E}{\pi \omega X^2} \quad (25)$$

Figure 18A:
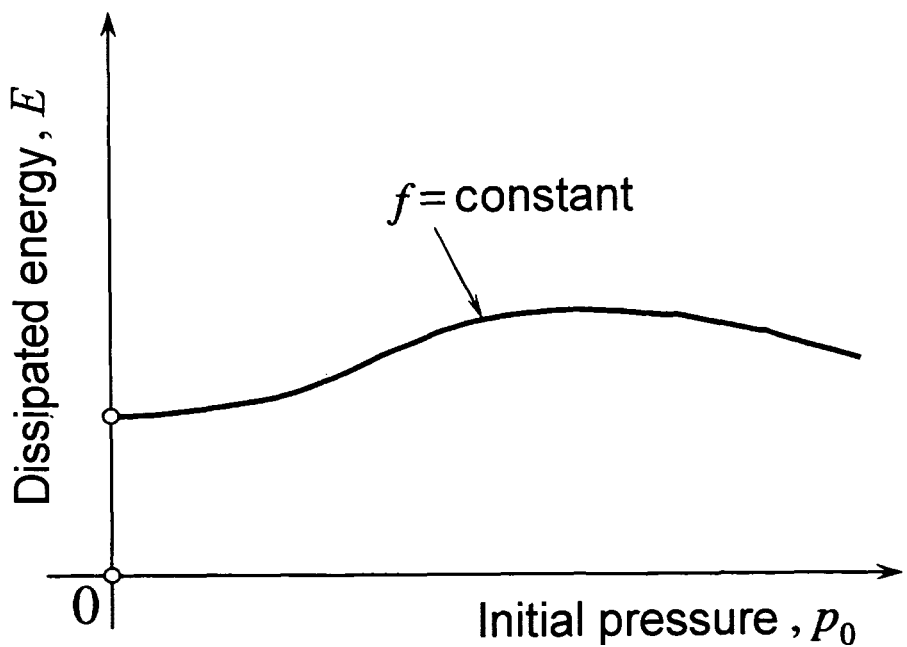
FIG. 18A is a graph showing the phenomenological relation between the damping characteristic of the active-control colloidal damper and the initial pressure, namely, showing the relation between the dissipated energy and the initial pressure.
Figure 18B:
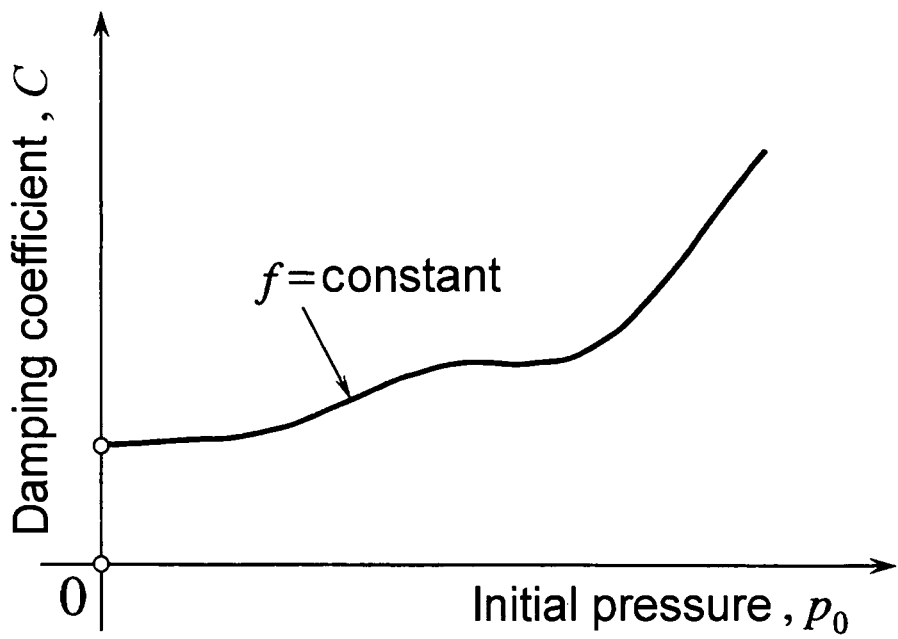
FIG. 18B is a graph showing the phenomenological relation between the damping characteristic of the active-control colloidal damper and the initial pressure, namely, showing the relation between the damping coefficient and the initial pressure.

As shown in FIGS. 16A to 16F, the damping characteristic of the active-control colloidal damper 1 changes as the initial pressure $p_0$ (the initial position $S_0$) varies. FIG. 18A and FIG. 18B show the phenomenological relation between the damping characteristic of the active-control colloidal damper 1 and the initial pressure. In conclusion, the results obtained through the phenomenological models (see FIGS. 16A to 16F, as well as FIGS. 18A and 18B) are in agreement with the results obtained through experiments (see FIG. 17, FIG. 12 and FIG. 15B). Additionally, since the piston speed $v=2S_V f$ of the active-control colloidal damper 1 is restricted to a maximum speed $v_{max}$ of the test rig, if the frequency "f" becomes higher, the amplitude $S_V$ of the displacement excitation becomes lower, and thus, the hysteresis becomes smaller (see FIGS. 11A and 11B).

In light of the above-mentioned matters, considering the control conditions relative to all the operational pressures (the external pressure, the internal pressure, and the pressure due to the friction force), one understands that the damping characteristic of the active-control colloidal damper 1 can be sufficiently controlled if the pressure has a fluctuation rate of at least 10%. Herein, water (the working liquid 7) at a temperature of 20 degrees centigrade has a surface tension $\gamma_L$ of 72.6 mN/m, and silica gel (the porous bodies 8), which is hydrophobized by employing linear molecular chains of organo-silicon compounds, has a surface tension $\gamma_S$ of 21 mN/m. By using these numerical values, one firstly calculates the values of the functions $f_{1,2}(\gamma_L, \gamma_S)$, which depend on the surface tensions $\gamma_L$ and $\gamma_S$ in accordance with the Equations (14) and (15). Accordingly, in order to obtain a fluctuation rate of 10% of the pressure, it is necessary to produce a fluctuation rate of the water's surface tension of at least 1.7%, or a fluctuation rate of the hydrophobic silica gel's surface tension of at least 3.9%. Consequently, one understands that the active-control colloidal damper 1 has the highest sensitivity relative to the control of the water's surface tension.

Figure 4:
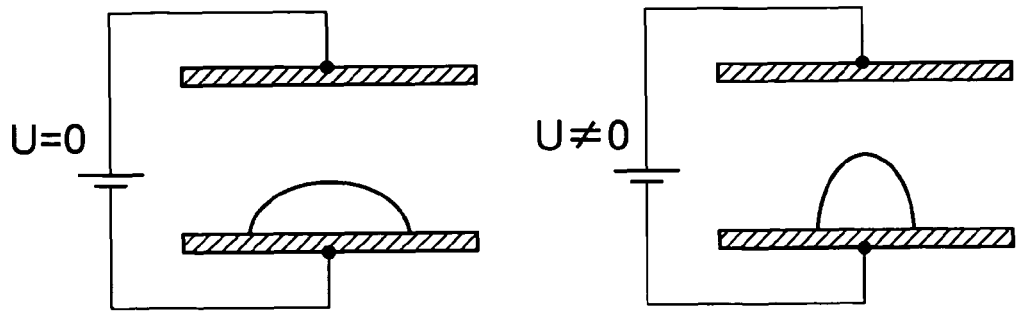
FIG. 4 is a drawing used to explain how the shape of a droplet of the working liquid (polar liquid) varies when an electric field is applied.

Next, one illustrates the experimental results concerning the mechanism of control of the surface tension for the working liquid 7 and the porous bodies 8. Table 1 shows the experimental results concerning the fluctuation rate of the surface tension of water, considered as working liquid 7, obtained by fluctuating an electric field (voltage U (see FIG. 4)), when the temperature was set to T=24.5° C.

TABLE 1

| | U [kV] | | | | | | | | | |
|---|---|---|---|---|---|---|---|---|---|---|
| | 0 | 1 | 2 | 3 | 4 | 5 | 6 | 7 | 8 | 9 |
| $\gamma_L$ [mN/m] | 76.0 | 72.5 | 73.3 | 72.9 | 73.9 | 74.4 | 75.4 | 77.4 | 78.0 | 84.5 |
| $\Delta\gamma_L/\gamma_L$ [%] | 0 | −0.1 | 1.0 | 0.4 | 1.8 | 2.5 | 3.9 | 6.6 | 7.4 | 16.4 |

Since the fluctuation rate of the surface tension of the working liquid 7 has to be equal to or larger than 1.7%, according to Table 1 ($\Delta\gamma_L/\gamma_L \geq 1.7\%$), in order to satisfy the control condition (10% fluctuation rate of the pressure), the voltage U has to be equal to or larger than 4 kV (U≥4 kV).

Figure 5:
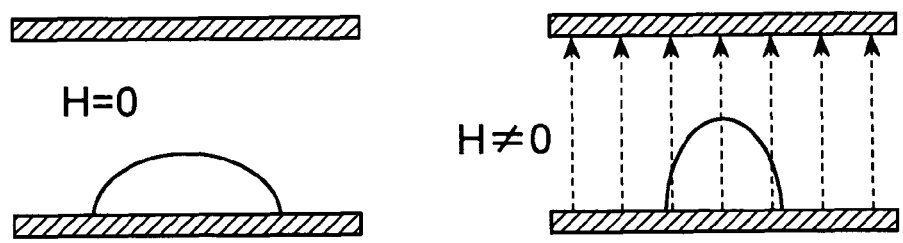
FIG. 5 is a drawing used to explain how the shape of a droplet of the working liquid (liquid with magnetic properties) varies when a magnetic field is applied.

It is also possible to control the surface tension of water, considered as working liquid 7, by varying the magnetic field (magnetic field H (see FIG. 5)), in which case, the required operational condition is that; for instance, iron particles as magnetic material has to be mixed with water, in this way the water being transformed into a liquid with magnetic properties. Additionally, in order to satisfy the control condition (10% fluctuation rate of the pressure), the required magnetic field and the required volume of magnetic particles are determined in accordance with the Equation (16) in such a way that the fluctuation rate of the surface tension of water becomes equal to or larger than 1.7% ($\Delta\gamma_L/\gamma_L \geq 1.7\%$).

Table 2 shows the fluctuation rate of the surface tension of water in function of the temperature T, calculated in accordance with the Equation (17). In order to satisfy the control condition (10% fluctuation rate of the pressure), the fluctuation rate of the surface tension of water should be equal or larger than 1.7% ($\Delta\gamma_L/\gamma_L \geq 1.7\%$), and consequently, from Table 2, the required temperature fluctuation should be $\Delta T=\pm 4°$ C.

TABLE 2

| | T [° C.] | | | | | | | | |
|---|---|---|---|---|---|---|---|---|---|
| | 0 | 10 | 20 | 30 | 40 | 50 | 60 | 70 | 80 |
| $\gamma_L$ [mN/m] | 76.0 | 74.3 | 72.6 | 70.9 | 69.2 | 67.5 | 65.8 | 64.1 | 62.4 |
| $\Delta\gamma_L/\gamma_L$ [%] | 4.7 | 2.3 | 0 | −2.3 | −4.7 | −7.0 | −9.4 | −11.7 | −14.1 |

Figure 19A:
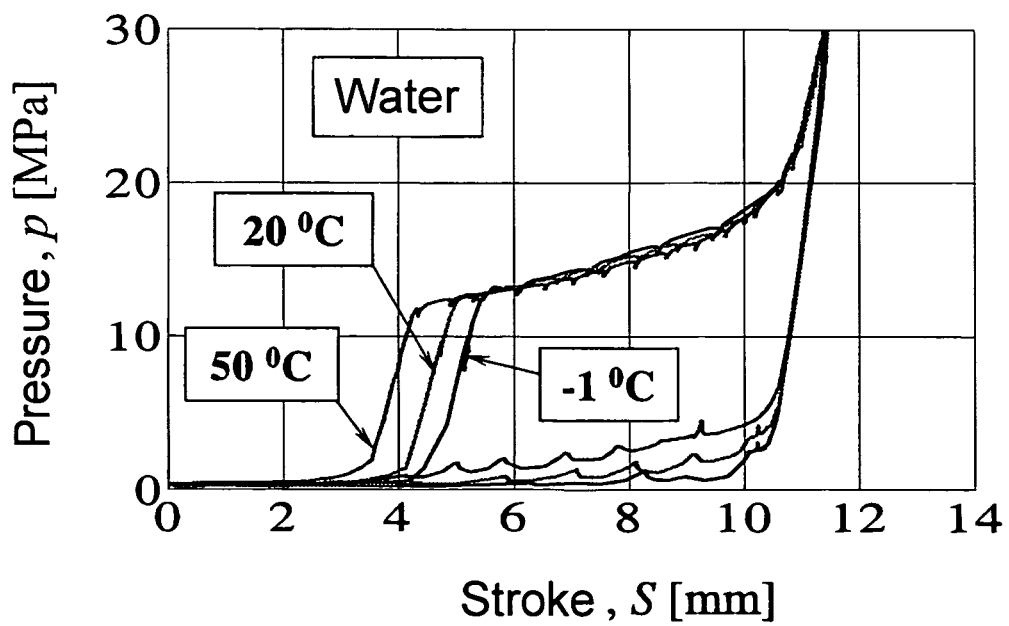
FIG. 19A is a graph showing how the hysteresis changes as the temperature of the active-control colloidal damper varies, in the case when the working liquid is comprised of water.
Figure 19B:
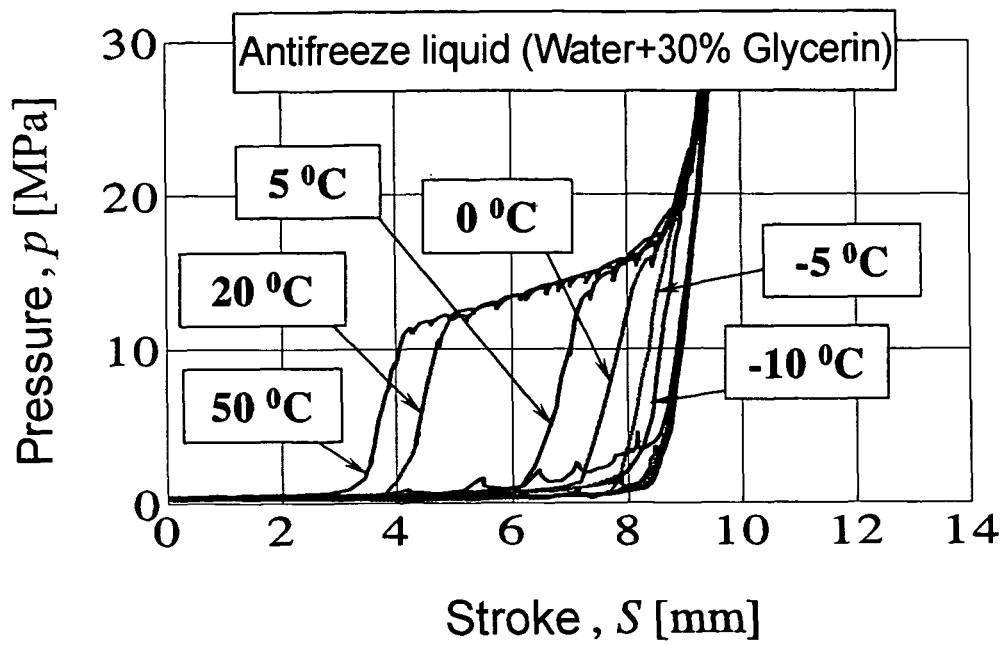
FIG. 19B is a graph showing how the hysteresis changes as the temperature of the active-control colloidal damper varies, in the case when the working liquid is comprised of antifreeze liquid.
Figure 20:
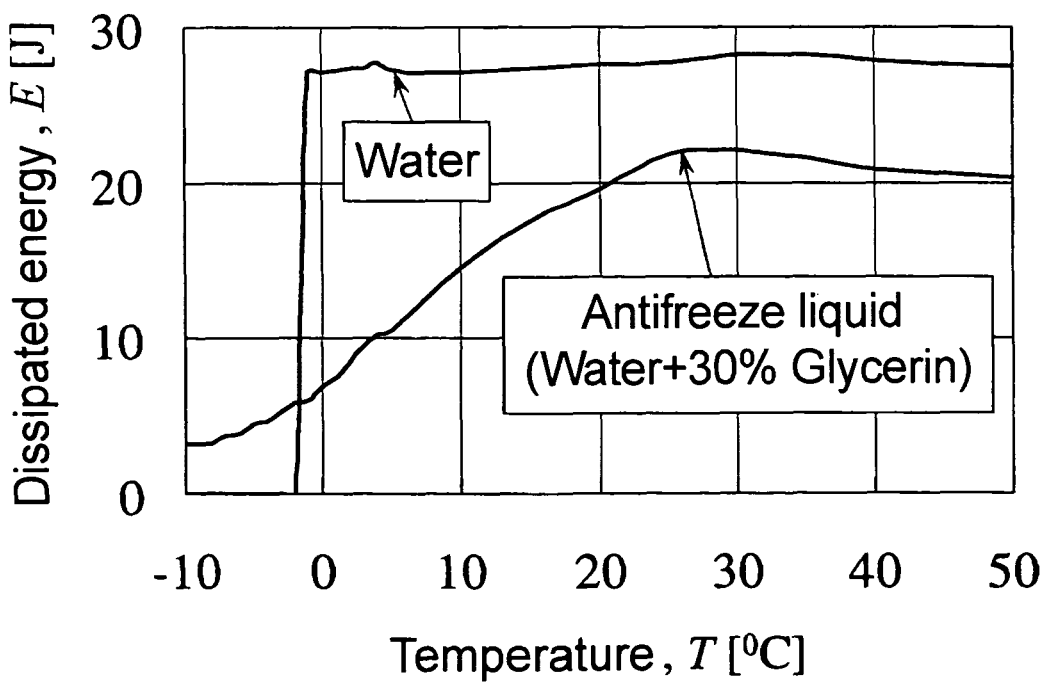
FIG. 20 is a graph showing the relation between the dissipated energy and the temperature.

An active-control colloidal damper which is able to control the surface tension of the working liquid 7 in function of the temperature fluctuation was actually fabricated and tested. The experimental model of the active-control colloidal damper was introduced into a temperature controlling chamber (an incubator), and then, experiments at various temperatures were conducted. The experiments were conducted in the range of temperature from −10° C. to +50° C., for an active-control colloidal damper employing water as working liquid 7, and also for an active-control colloidal damper employing an antifreeze liquid (a mixture of water and 30% glycerin). The hysteresis change as the temperature of the active-control colloidal damper varies, measured both for water and the antifreeze liquid, is shown in FIG. 19A and FIG. 19B, respectively. The relation found between the dissipated energy and the temperature is shown in FIG. 20.

One understands from FIGS. 19A and 19B that as the temperature rises, the maximum stroke increases and this is accompanied by an increase of the internal pressure during depressurization "$p_r$". Accordingly, it is obvious that the shape of the hysteresis is considerably affected by the temperature fluctuation. However, one observes that when the active-control colloidal damper employs water (FIG. 19A), although the hysteresis changes its shape, the dissipated energy has almost a constant value regardless the temperature control (FIG. 20). Thus, one concludes that, in the case when water is used as the working liquid, compared with the case when antifreeze liquid is used as the working liquid, the control of the damping characteristic of the active-control colloidal damper is less effective. From FIG. 20, for the case when antifreeze liquid is used as the working liquid, an effective temperature range, from the control standpoint, is from −5° C. to +25° C. (the linear portion of the graph). Accordingly, inside of above-mentioned temperature range, it becomes possible to obtain sufficient fluctuation of the dissipated energy, since the required temperature fluctuation of $\Delta T=\pm 4°$ C. can be attained. Furthermore, when water transforms into ice, the piston 4 cannot move, in which case, the damping effect (dissipated energy) becomes zero. Oppositely, in the case when the antifreeze liquid is used as the working liquid, although the dissipated energy is considerably reduced, it becomes possible to extend the temperature range in which the active-control colloidal damper can operate, up to −10° C.

Next, the change of the damping characteristic of the active-control colloidal damper, produced by the control of the radius of the pores 8a of the porous bodies 8, was experimentally investigated. In order to satisfy the control condition of a 10% fluctuation rate of the pressure, according to the Equation (18), the fluctuation rate of the radius of the pores 8a has to be equal to 10%. Accordingly, concerning all the control parameters, by comparison with the above-mentioned surface tension, one understands that the sensitivity resulted from the radius fluctuation (adjustment) of the pores 8a, is the lowest.

When the surface tensions of the porous bodies 8 and the working liquid 7 are not depending on the stroke, namely, the surface tensions of the porous bodies 8 and the working liquid 7 are not depending on the specific volume of the pores 8a, the Equation (21) can be rewritten into a simpler form (the Equation (26)).

$$E_{max} = \qquad (26)$$
$$2M\left\{\{\gamma_{L,c} - 2\sqrt{\gamma_{L,c}\gamma_{S,c}}\exp[-\beta(\gamma_{L,c} - \gamma_{S,c})^2]\}\int_0^{V_{P,max}}\frac{dV_P}{r_c(V_P)} - \right.$$
$$\left.\{\gamma_{L,r} - 2\sqrt{\gamma_{L,r}\gamma_{S,r}}\exp[-\beta(\gamma_{L,r} - \gamma_{S,r})^2]\}\int_0^{V_{P,max}}\frac{dV_P}{r_r(V_P)}\right\}$$

Figure 21A:
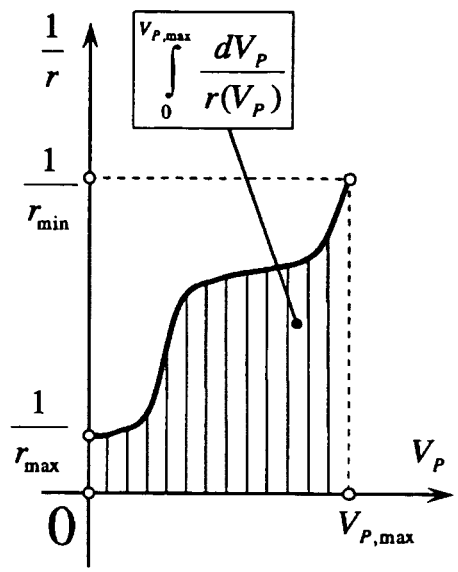
FIG. 21A is a graph showing the relation between the fabrication parameter of silica gel and the radius of a pore, namely, showing the definition of the fabrication parameter of silica gel.
Figure 21B:
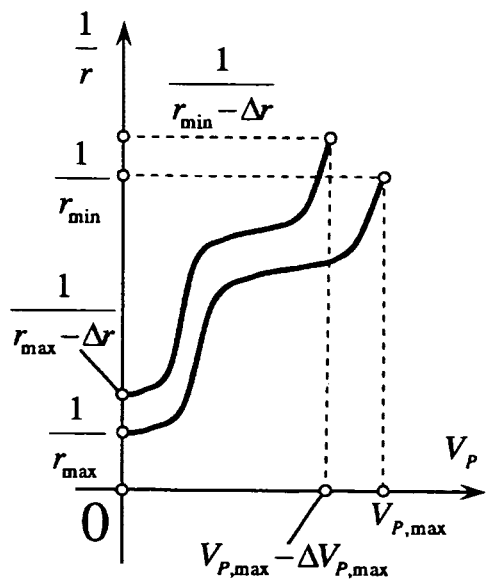
FIG. 21B is a graph showing the relation between the fabrication parameter of silica gel and the radius of a pore, namely, showing the relation between the fabrication parameter of silica gel and the fluctuation of the pore radius.

In light of the Equation (26), the dissipated energy is depending on the fabrication parameter of the porous bodies 8, $$\int_0^{V_{P,max}} dV_P/r(V_P)$$

namely, it is depending on the integral of an inverse distribution of the pore radii over the variation range of the specific volume "$V_p$" of the porous bodies 8 (see FIG. 21A). Although the relation between the pressure fluctuation rate and the fluctuation rate of the radii of the pores can be simply expressed (the Equation (18)), the dissipated energy is complexly influenced, since as illustrated in FIG. 21B, the fabrication parameter of the porous bodies $$\int_0^{V_{P,max}} dV_P/r(V_P)$$

varies with respect to both the maximum specific volume of the porous bodies 8 and to the fluctuation of the pore size distribution.

Figure 22A:
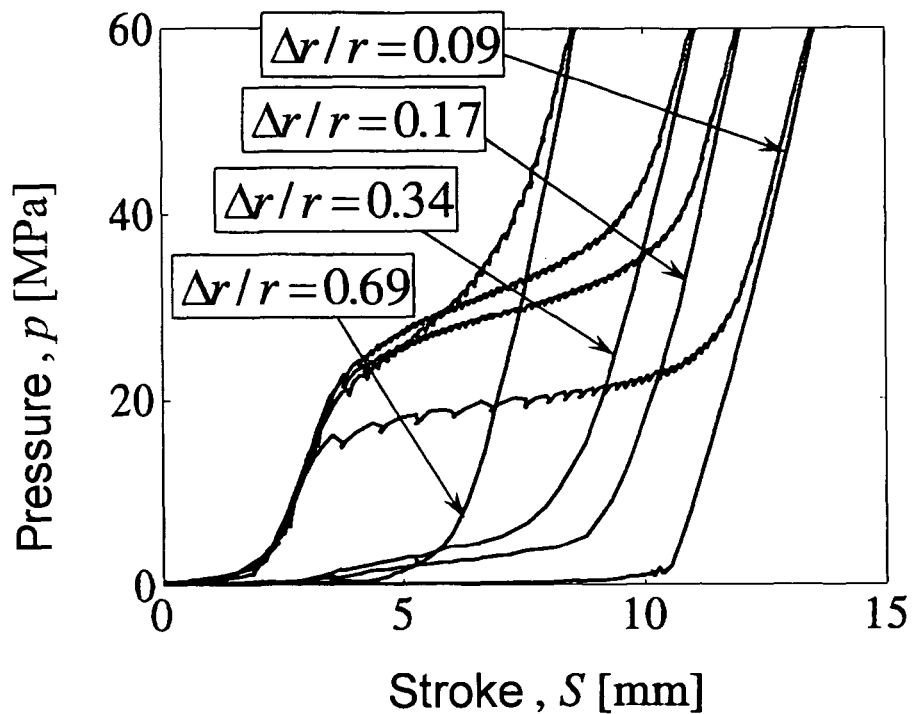
FIG. 22A shows the relation between the fluctuation of the pore radius of the porous body and the change in the dissipation ability of the active-control colloidal damper, namely, shows the relation between the hysteresis shape and the fluctuation rate of the pore radius.
Figure 22B:
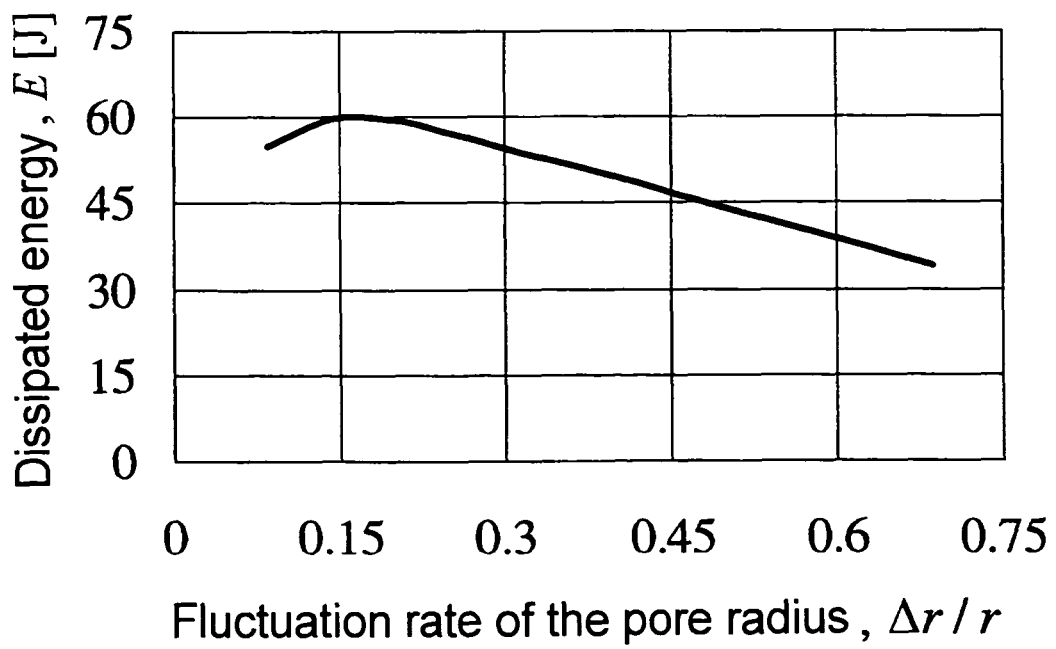
FIG. 22B shows the relation between the fluctuation of the pore radius of the porous body and the change in the dissipation ability of the active-control colloidal damper, namely, shows the relation between the dissipated energy and the fluctuation rate of the pore radius.

An active-control colloidal damper which is able to control the radii of the pores 8a of the porous bodies 8 was actually fabricated and tested. Specifically, in the experimental model of the colloidal damper, the working liquid 7 was comprised of water, the piston 4 had a diameter D=20 mm, the temperature T was set to 20° C., and the silica gel mass was selected as M=4 g. Under such conditions, the radii of the pores 8a were controllably reduced (r→(r−Δr)). As a result, with respect to the radius fluctuation rate Δr/r of the pores 8a, the hystresis shape variation is shown in FIG. 22A, and the relation between the dissipated energy and the fluctuation rate of the pore radius is shown in FIG. 22B. From these results one understands that, as the radius of the pores 8a decreases (r→(r−Δr)), the maximum specific volume (see FIG. 21B) decreases similarly as the maximum stroke (see FIG. 22A).

On the other hand, the inverse pore size distribution (see FIG. 21B) increases similarly as the internal pressure during pressurization "$p_c$" and the internal pressure during depressurization "$p_r$" (see FIG. 22A).

From FIGS. 22A and 22B, one understands that it is possible to provide an active-control colloidal damper which is able to control the radius of the pores 8a. Also, from FIG. 22B, one observes that the dissipated energy is maxmized when the radius fluctuation rate "Δr/r" of the pores 8a becomes equal to 0.17 (Δr/r=0.17), and then linearly reduces as the radius fluctuation rate becomes larger.

Next, the fluctuation of the damping characteristic produced by the variation of the mass of silica gel, water and colloidal solution was experimentally investigated. The same above-mentioned experimental model of the colloidal damper was employed during the tests, namely, the working liquid 7 was comprised of water, the piston 4 had a diameter D=20 mm, and the temperature T was set to 20° C. The porous bodies 8 were comprised of silica gel with a mass varying in the range from 1 gram to 6 grams. As a result, the hystresis shape variation produced by the mass fluctuation of silica gel is shown in FIG. 23A, and the relation between the dissipated energy and the mass of silica gel is shown in FIG. 23B.

Figure 23A:
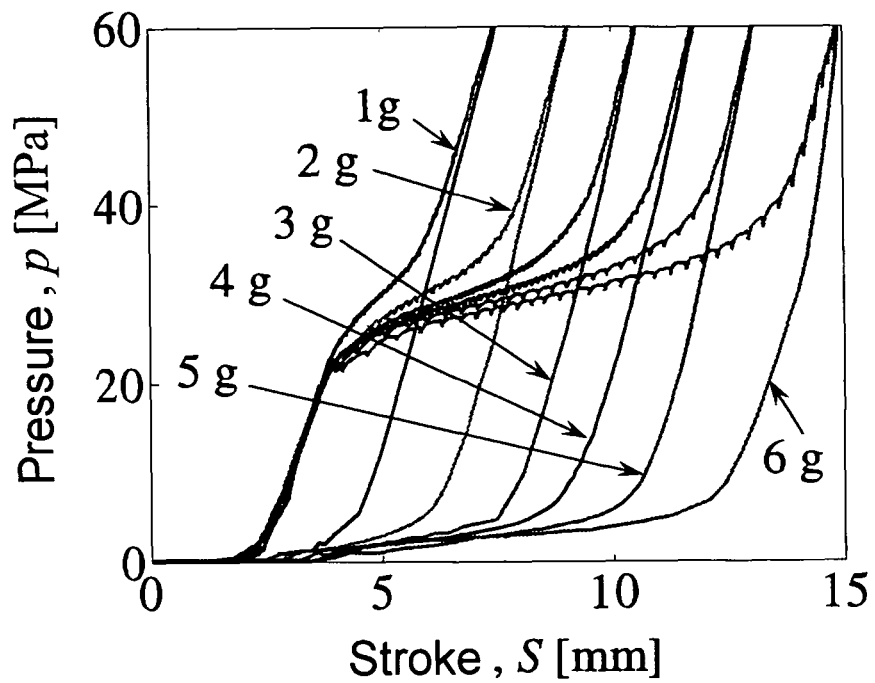
FIG. 23A is a graph showing how the dissipation ability of the active-control colloidal damper changes by adjusting the mass of silica gel, namely, showing the relation between the hysteresis shape and the mass fluctuation.
Figure 23B:
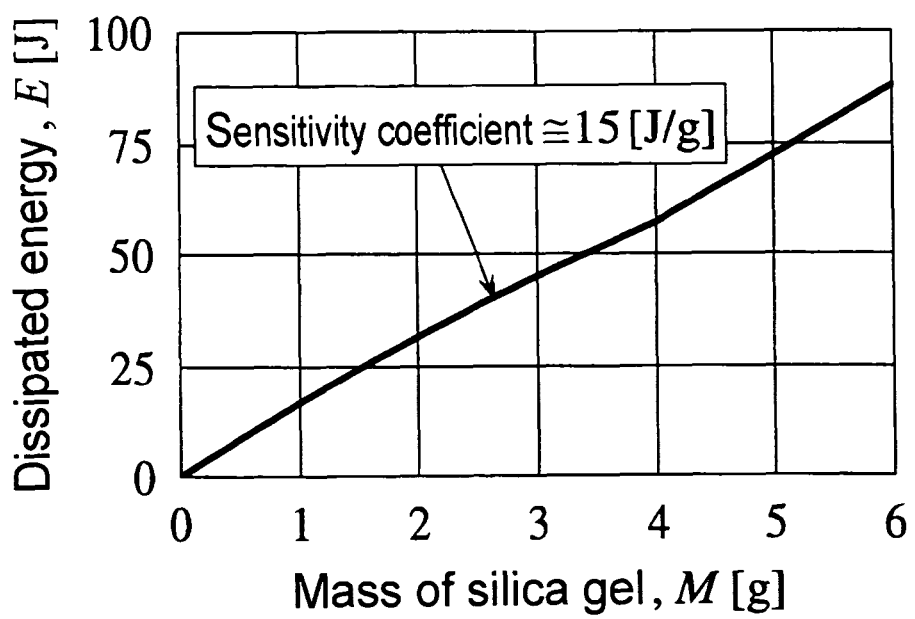
FIG. 23B is a graph showing how the dissipation ability of the active-control colloidal damper changes by adjusting the mass of silica gel, namely, showing the relation between the dissipated energy and the mass of silica gel.

From FIG. 23A, one observes that the damping characteristic of the active-control colloidal damper can be controlled by fluctuating the mass of silica gel. Furthermore, it is also possible to observe that the dissipated energy E varies directly proportional with the mass M of silica gel, and that the sensitivity coefficient of the active-control colloidal damper ΔE/ΔM is equal to 15 J/g (ΔE/ΔM=15 J/g).

The active-control colloidal damper combines the technology of the passive-control colloidal damper and the existent technology of general control, and by comparison with the active-control hydraulic damper, it has the following advantages: its damping efficiency is two or three times higher, it has the ability to dissipate the energy of vibration and/or impact (shock) without generation of heat and without dependence on the speed of the piston, there is no oil used which may pollute the environment, and it can be readily controlled due to the reduced number of measurement and/or control parameters.

INDUSTRIAL APPLICABILITY

The active-control colloidal damper in accordance with the present invention is useful as a damper for suspension equipment of various vehicles such as automobiles, race cars, trucks, bulldozers, airplanes, landing crafts, motor boats, and hydroplanes, and as a damper for anti-seismic systems, etc. In particular, the active-control colloidal damper in accordance with the present invention is useful to replace the conventional active-control hydraulic damper in various applications. Additionally, the active-control colloidal damper in accordance with the present invention can be used as a safety device against wind-induced vibrations for bridges or very high buildings (sky-scrapers), as a vibration control device or as a seismic isolator in various anti-seismic systems.

What is claimed is:

1. An actively controlled colloidal damper comprising:
    a cylinder;
    a piston guided and supported by the cylinder, the piston having a reciprocating motion and defining a closed space in association with the cylinder;
    a porous body having a large number of pores, and being housed in the closed space;
    a working liquid being housed in the closed space together with the porous body, the working liquid flowing into the pores of the porous body during pressurization, and flowing out from the pores of the porous body during depressurization; and a pressure controlling device that controls dissipated energy and a damping coefficient of the actively controlled colloidal damper, according to the following Equation (6):

$$E_{p_0>0} = \frac{\pi D^2}{4} \int_{S_0-S_V}^{S_0+S_V} [p_c(S) - p_r(S)]dS = \frac{\pi D^2}{4} \int_0^{S_0+S_V} [p_c(S) - p_r(S)]dS > E_{p_0=0};$$

$$C_{p_0>0} = \frac{E_{p_0>0}}{\pi \omega S_V^2} > C_{p_0=0}$$

(6)

wherein E is the dissipated energy, C is the damping coefficient, D is diameter of the piston, S is displacement excitation, $S_v$ is amplitude of the displacement excitation, $S_0$ is a start position of the piston, ω is circular excitation frequency, $p_0$ is initial pressure, $p_c$ is internal pressure during pressurization of the closed space, and $p_r$ is internal pressure during depressurization of the closed space.

2. The actively controlled colloidal damper as set forth in claim 1, wherein the pressure controlling device comprises an initial pressure controlling device that adjusts the initial pressure $p_0$ and the start position $S_0$ of the piston.

3. The actively controlled colloidal damper as set forth in claim 1, wherein the pressure controlling device comprises an internal pressure controlling device that adjusts at least one of the internal pressures of the closed space during pressurization ($p_c$) and during depressurization ($p_r$), according to the following Equation (12):

$$p = \frac{2}{r}\{\gamma_L - 2\sqrt{\gamma_L \gamma_S} \exp[-\beta(\gamma_L - \gamma_S)^2]\}$$

(12)

wherein the internal pressure p of the closed space becomes $p_c$ during pressurization and $p_r$ during depressurization, a radius r of the pores of the porous body becomes $r_c$ during pressurization and $r_r$ during depressurization, surface tension $\gamma_L$ of the working liquid becomes $\gamma_{L,c}$ during pressurization and $\gamma_{L,r}$ during depressurization, surface tension $\gamma_S$ of the porous body becomes $\gamma_{S,c}$ during pressurization and $\gamma_{S,r}$ during depressurization, and β is a constant.

4. The actively controlled colloidal damper as set forth in claim 2, wherein the initial pressure controlling device comprises a pumping device in communication with the closed space, the pumping device being arranged and adapted to force a mixture consisting of the working liquid and the porous body to flow into the closed space and to flow out from the closed space to thereby adjust the initial pressure $p_0$ and the start position $S_0$ of the piston.

5. The actively controlled colloidal damper as set forth in claim 2, wherein the initial pressure controlling device comprises a pumping device in communication with the closed space, the pumping device being arranged and adapted to force only the working liquid to flow into the closed space and to flow out from the closed space to thereby adjust the initial pressure $p_0$ and the start position $S_0$ of the piston.

6. The actively controlled colloidal damper as set forth in claim 2, wherein the initial pressure controlling device is arranged and adapted to generate elastic bending waves on at least one of the walls of the porous body and of the cylinder, and to exert a controllable acoustic radiation pressure to the working liquid, according to the following Equation (8):

$$p_0 = p_{rad} = \pi^2 \rho f_v^2 u_0^2 (2+\Gamma)$$

(8)

wherein $p_{rad}$ is the acoustic radiation pressure, ρ is density of the working liquid, $f_v$ is frequency of the acoustic waves which are in at least one of the domains of subsonic and ultrasonic waves, $u_0$ is amplitude of the elastic bending waves generated on at least one of the walls of the porous body and of the cylinder, and Γ is a non-dimensional geometrical parameter, to thereby adjust the initial pressure $p_0$ and the start position $S_0$ of the piston.

7. The actively controlled colloidal damper as set forth in claim 3, wherein the internal pressure controlling device is arranged and adapted to generate in the closed space at least one of a controllable electric field, a controllable magnetic field, and a controllable temperature gradient, and to adjust at least one of the surface tensions of the porous body and of the working liquid, during at least one, of the phases of pressurization and of depressurization of the closed space, to thereby adjust at least one of the internal pressures of the closed space during pressurization ($p_c$) and during depressurization ($p_r$).

8. The actively controlled colloidal damper as set forth in claim 3,
wherein the working liquid includes a surfactant having a reversible oxidation-reduction characteristic, and
wherein the internal pressure controlling device is arranged and adapted to electrochemically control the reversible oxidation-reduction characteristic of the surfactant, and to adjust at least one of the surface tensions of the porous body and of the working liquid, during at least one of the phases of pressurization and of depressurization of the closed space, to thereby adjust at least one of the internal pressures of the closed space during pressurization ($p_c$) and during depressurization ($p_r$).

9. The actively controlled colloidal damper as set forth in claim 3,
wherein the working liquid includes a surfactant exhibiting a reversible photoisomerization characteristic when irradiated with rays from at least one of the domains of light and of ultraviolet rays, and
wherein the internal pressure controlling device is arranged and adapted to irradiate the surfactant with rays from at least one of the domains of light and of ultraviolet rays, and by controlling the reversible photoisomerization characteristic of the surfactant, to adjust at least one of the surface tensions of the porous body and of the working liquid during at least one of the phases of pressurization and of depressurization of the closed space, to thereby adjust at least one of the internal pressures of the closed space during pressurization ($p_c$) and during depressurization ($p_r$).

10. The actively controlled colloidal damper as set forth in claim 3,
wherein the porous body is coated with a liquid-repellent coating, and
wherein the internal pressure controlling device, is arranged and adapted to irradiate the liquid-repellent coating with rays from at least one of the domains of light and of ultraviolet rays, and by producing at least one of the movements of rotation, extension and contraction of the molecules of the liquid-repellent coating, to adjust at least one of the radii of the pores of the porous body during at least one of the phases of pressurization and of depressurization of the closed space, to thereby adjust at least one of the internal pressures of the closed space during pressurization ($p_c$) and during depressurization ($p_r$).

11. The actively controlled colloidal damper as set forth in claim 3,
wherein the internal pressure controlling device is arranged and adapted to generate elastic bending waves on at least one of the walls of the porous body, and to adjust at least one of the radii of the pores of the porous body during at least one of the phases of pressurization and of depressurization of the closed space, to thereby adjust at least one of the internal pressures of the closed space during pressurization ($p_c$) and during depressurization ($p_r$).

12. The actively controlled colloidal damper as set forth in claim 1,
wherein a filter divides the closed space into a first closed space which is in communication with the piston and a second closed space which is not in communication with the piston,
wherein the filter allows the working liquid to pass through and does not allow the porous body to pass through,
wherein the porous body is housed only in the second closed space, and
wherein the pressure controlling device is in communication with the first closed space.

13. The actively controlled colloidal damper as set forth in claim 4, wherein the pumping device is arranged and adapted to adjust the mass of the mixture consisting of the working liquid and the porous body housed in the closed space, to thereby control the dissipated energy and the damping coefficient of the actively controlled colloidal damper.

14. The actively controlled colloidal damper as set forth in claim 5, wherein the pumping device is arranged and adapted to adjust the mass of the working liquid housed in the closed space, or to adjust the mass of the mixture consisting of the working liquid and the porous body housed in the closed space, to thereby control the dissipated energy and the damping coefficient of the actively controlled colloidal damper.

15. The actively controlled colloidal damper as set forth in claim 2, wherein the initial pressure controlling device is arranged and adapted to produce a fluctuation rate of the initial pressure of at least 10%.

16. The actively controlled colloidal damper as set forth in claim 3, wherein the internal pressure controlling device is arranged and adapted to produce a fluctuation rate of the internal pressure of at least 10%, during at least one of the phases of pressurization and of depressurization of the closed space.

* * * * *